US009942851B2

(12) United States Patent
Shanmugasundaram et al.

(10) Patent No.: US 9,942,851 B2
(45) Date of Patent: *Apr. 10, 2018

(54) DYNAMIC POWER MANAGEMENT IN A WIRELESS DEVICE

(71) Applicant: Marvell World Trade Ltd., St. Michael (BB)

(72) Inventors: Venkatachalam Shanmugasundaram, Cupertino, CA (US); Parika Beniwal, San Jose, CA (US); Ken Yeung, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 57 days.

This patent is subject to a terminal disclaimer.

(21) Appl. No.: 15/230,648

(22) Filed: Aug. 8, 2016

(65) Prior Publication Data

US 2016/0345268 A1   Nov. 24, 2016

Related U.S. Application Data

(63) Continuation of application No. 14/062,553, filed on Oct. 24, 2013, now Pat. No. 9,414,317.

(Continued)

(51) Int. Cl.
*H04W 52/02* (2009.01)

(52) U.S. Cl.
CPC ... *H04W 52/0251* (2013.01); *H04W 52/0225* (2013.01); *Y02B 60/50* (2013.01)

(58) Field of Classification Search
CPC .. H04W 52/00; H04W 52/02; H04W 52/0219
See application file for complete search history.

(56) References Cited

U.S. PATENT DOCUMENTS 6,542,727 B1 *  4/2003  Kikuchi ............. H04W 52/029
                                                340/7.33
9,414,317 B2     8/2016  Shanmugasundaram et al.
(Continued)

FOREIGN PATENT DOCUMENTS

| EP | 2 290 780 | 3/2011 | |
| EP | 2290780 A1 * | 3/2011 | ......... H01M 10/425 |
| JP | 2012-105001 | 5/2012 | |

OTHER PUBLICATIONS

Communication Pursuant to Article 94(3) EPC in European Patent Application No. 13788837.6, dated Feb. 10, 2017 (6 pages).

(Continued)

*Primary Examiner* — Kamran Afshar
*Assistant Examiner* — Farideh Madani

(57) ABSTRACT

A power management device of a wireless communication assembly receives respective signals indicative of respective voltage supply levels required by respective hardware devices among a plurality of hardware devices of the wireless communication assembly, where the respective required voltage supply levels vary over time. The power management device selects a voltage supply level corresponding to a maximum voltage supply level indicated by the respective received signals, adjusts, based on the selected supply voltage level, a supply voltage supplied to the wireless communication assembly so that the selected voltage supply level is supplied to all of the hardware devices of the wireless communication assembly.

18 Claims, 13 Drawing Sheets

Related U.S. Application Data

(60) Provisional application No. 61/717,912, filed on Oct. 24, 2012.

(56) References Cited

U.S. PATENT DOCUMENTS

| | | | |
|---|---|---|---|
| 2005/0141741 | A1 | 6/2005 | Van Oerle |
| 2007/0262754 | A1 | 11/2007 | Burton |
| 2008/0279129 | A1 | 11/2008 | Zhodzishsky et al. |
| 2009/0081971 | A1 | 3/2009 | Rofougaran et al. |
| 2009/0275355 | A1* | 11/2009 | Tan .................. H04W 52/0251 455/522 |
| 2012/0062190 | A1 | 3/2012 | Haiplik et al. |

OTHER PUBLICATIONS

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," The Institute of Electrical and Electronics Engineers, Inc., pp. 1-92, (1999) Reaffirmed (Jun. 12, 2003).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," The Institute of Electrical and Electronics Engineers, Inc., pp. 1-83 (Sep. 1999).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., Jan. 2012.

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., Mar. 2012.

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., Jun. 2012.

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., Oct. 2012.

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., Jan. 2013.

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., Jul. 2013.

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," The Institute of Electrical and Electronics Engineers, Inc., Nov. 2011.

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," The Institute of Electrical and Electronics Engineers, Inc., pp. 1-89 (Sep. 1999).

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," The Institute of Electrical and Electronics Engineers, Inc., pp. 1-23 (Nov. 7, 2001).

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," The Institute of Electrical and Electronics Engineers, Inc., pp. 1-53 (May 2002).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," The Institute of Electrical and Electronics Engineers, Inc., pp. 1-69 (Apr. 2003).

IEEE P802.11n™ D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," The Institute of Electrical and Electronics Engineers, Inc., pp. 1-544 (Sep. 2007).

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," The Institute of Electrical and Electronics Engineers, Inc., pp. 1-535 (Oct. 2009).

(56) References Cited

OTHER PUBLICATIONS

IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, The Institute of Electrical and Electronics Engineers, Inc., pp. 1-512 (1999).

Chen, "Home Network Basis: Transmission Environments and Wired/Wireless Protocols," Prentice Hall, pp. 1-26 (Jul. 2006).

Hiertz et al., "The IEEE 802.11 Universe," IEEE Communications Magazine, pp. 62-70, (Jan. 2010).

International Preliminary Report on Patentability in International Application No. PCT/US2013/066629, dated May 7, 2015 (7 pages).

International Search Report and Written Opinion in Application No. PCT/US2013/066629, dated Feb. 5, 2014 (8 pages).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Mujtaba, "IEEE P802.11—Wireless LANs, TGn Sync Proposal Technical Specification," The Institute of Electrical and Electronics Engineers, Inc., doc.: IEEE 802.11-04/0889r6, pp. 1-131 (May 2005).

Specification of the Bluetooth System, Version 2.0: vol. 0, "Master Table of Contents & Compliance Requirements," pp. 1-74; vol. 1, "Architecture & Terminology Overview," pp. 1-92; vol. 2, "Core System Package [Controller Volume]", pp. 1-814; vol. 4, "Core System Package [Host Volume]," pp. 1-250, (Nov. 4, 2004).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, Institute for Electrical and Electronics Engineers, pp. 1-49, (Jan. 18, 2011).

van Nee, et al., "The 802.11n MIMO-OFDM Standard for Wireless LAN and Beyond," Wireless Personal Communications, vol. 37, pp. 445-453 (Jun. 2006).

Notification of Reasons of Rejection in Japanese Patent Application No. 2015-539738, dated Aug. 28, 2017, with English translation (9 pages).

\* cited by examiner

| Freq[3:0] | Vlotage[3:0] | PLL[0:0] |
|---|---|---|
| ... | ... | ... |

*FIG. 6*

DYNAMIC POWER MANAGEMENT IN A WIRELESS DEVICE

CROSS-REFERENCE TO RELATED APPLICATIONS

This application is a continuation of U.S. patent application Ser. No. 14/062,553, now U.S. Pat. No. 9,414,317, entitled "Dynamic Power Management in a Wireless Device," filed Oct. 24, 2013, which claims the benefit of U.S. Provisional Patent Application No. 61/717,912, entitled "Method Using DVFS Based Technique to Reduce Power Consumption of Wireless SOCs," filed Oct. 24, 2012. The disclosures of the applications referenced above are hereby expressly incorporated herein by reference in their entireties.

FIELD OF TECHNOLOGY

The present disclosure relates generally to communication devices, and more particularly, to techniques for improving power saving operation in a wireless device.

BACKGROUND

Wireless communication devices enjoy relatively widespread use. Cellular phones are becoming commonplace. Many users connect their laptop computers to wireless local area networks (WLAN) at home and on the road. Motorists use wireless earpiece headsets for hands free calling operation while driving. Indeed, many automobile manufacturers provide hands-free operation integrated directly with the vehicle.

These devices traditionally would operate under one of a number of different networking protocols. WLAN devices for example typically operate under one of the various Institute of Electrical and Electronics Engineers (IEEE) 802.11 standard wireless protocols, first promulgated in 1999. These protocols include IEEE 802.11a, 802.11b, 802.11n, and 802.11g and operate at different spectrum bands and/or different multiplexing or spread spectrum schemes. The protocol coined WiFi allows one to establish a WLAN. Commonly, WLAN devices are used in an infrastructure network topology, in which communications are routed through a host, base station, or other access point. Another wireless protocol is the Bluetooth protocol, which is commonly used in an ad-hoc network topology configuration for peer-to-peer communication between devices, such as between a cellular handset phone and a wireless earpiece headset. As another example, the near field communication (NFC) protocols are for peer to peer communication between two devices in near proximity to each other. Either network configuration may support any number of devices including laptop computers, handheld computers, printers, storage media, and other network equipment, such as hosts, routers, switches, etc. In some examples, such as with Bluetooth protocols, the wireless devices may be handheld communicators like cellular telephones or walkie-talkies.

More recently, communication devices have been designed to support multiple network protocols (e.g., Bluetooth, WLAN and NFC) in the same device. For example, a cellular phone may be able to send and receive voice data with a headset over a Bluetooth channel and separately send and receive voice, video, image, text, and other data over an 802.11 channel. Moreover, such device often include other wireless communication features, such frequency modulation (FM) broadcast radio reception, for example.

Generally, wireless devices may operate using many different power sources. Some devices use a constant AC power source, while others operate off battery power, while others operate off of either. With the variety of power sources for devices on a network, power consumption has become an important aspect of network operation and thus an important aspect of wireless device operation.

SUMMARY OF THE DISCLOSURE

In an embodiment, a method includes: receiving, at a power management device of a wireless communication assembly, respective signals indicative of respective voltage supply levels required by respective hardware devices among a plurality of hardware devices of the wireless communication assembly, wherein the respective required voltage supply levels vary over time; selecting, at the power management device, a voltage supply level corresponding to a maximum voltage supply level indicated by the respective received signals; and adjusting, based on the selected supply voltage level, a supply voltage supplied to the wireless communication assembly so that the selected voltage supply level is supplied to all of the hardware devices of the wireless communication assembly.

In another embodiment, an apparatus comprises a wireless communication assembly having a plurality of hardware devices, and a power management device. The power management device is configured to: receive respective signals indicative of respective voltage supply levels required by respective hardware devices among the plurality of hardware devices of the wireless communication assembly, wherein the respective required voltage supply levels vary over time; select a voltage supply level corresponding to a maximum voltage supply level indicated by the respective received signals; and adjust a supply voltage supplied to the wireless communication assembly so that the selected voltage supply level is supplied to all of the hardware devices of the wireless communication assembly.

BRIEF DESCRIPTION OF THE DRAWINGS

FIG. 6 illustrates an example embodiment of a frequency and voltage table, according to an embodiment;

DETAILED DESCRIPTION

Figure 1:
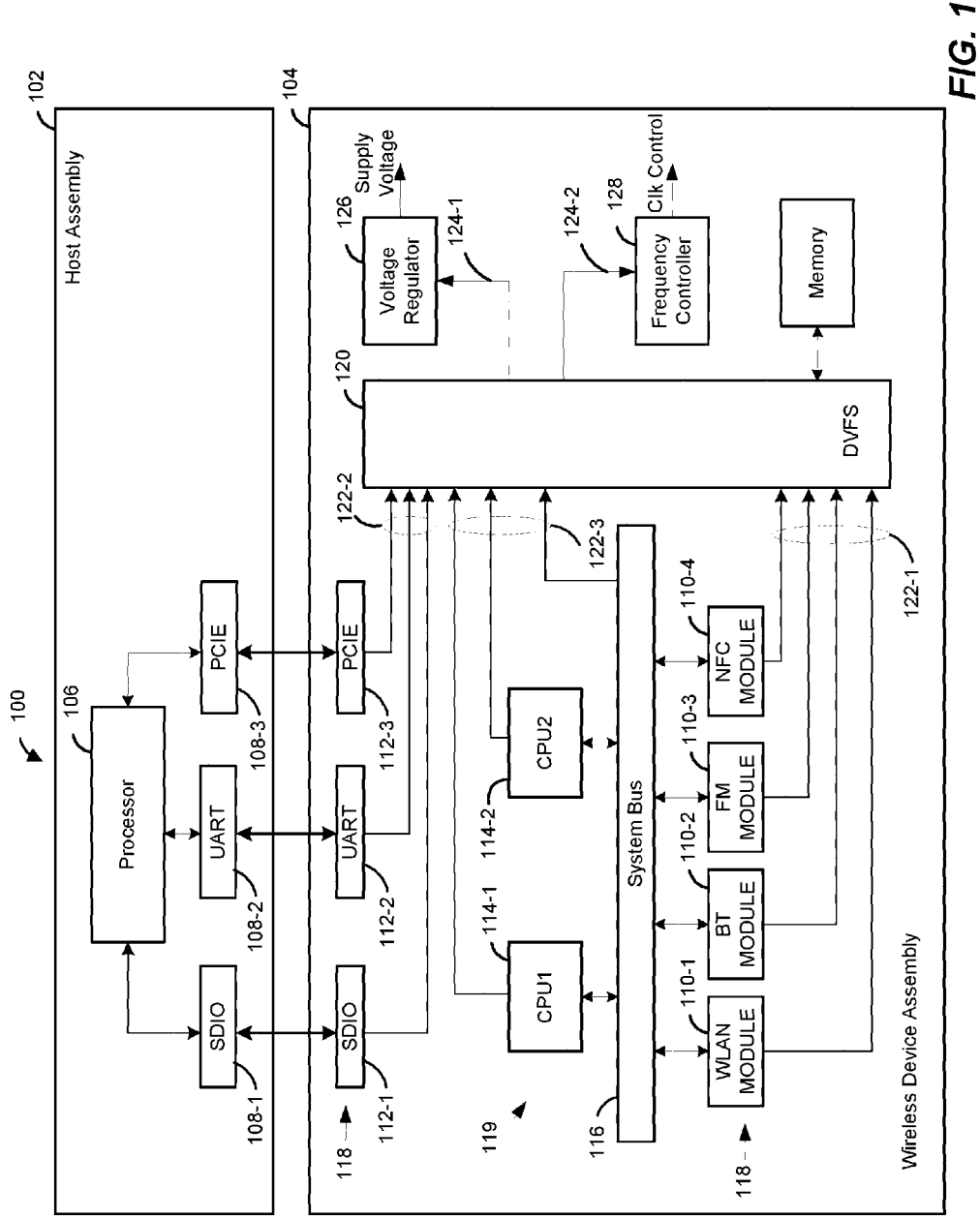
FIG. 1 is a block diagram of an example wireless device that utilizes dynamic voltage and frequency scaling to efficiently manage power consumption of the wireless device, according to an embodiment.

FIG. 1 is a block diagram of an example wireless device 100 that utilizes dynamic voltage and frequency scaling to efficiently manage power consumption of the wireless device 100, according to an embodiment. The wireless device 100 includes a host assembly 102 and a wireless assembly 104. The host assembly 102 includes a processor 106, which generally controls operation of the host assembly 102. In some embodiments, the processor 106 performs functions other than controlling operation of the host assembly 102, such as processing of packets received from the wireless assembly 104 via the interfaces 108, for example. The host assembly 102 also includes one or more interface units 108 that connect the host assembly 102 to the wireless assembly 104. In the example embodiment of FIG. 1, the interface units 108 include a secure digital input/output (SDIO) interface 108-1, a universal asynchronous receiver/transmitter (UART) interface 108-2 and a peripheral component interconnect express (PCIE) interface 108-3. In other embodiments, the host assembly 102 omits one or more of the interface units 108 illustrated in FIG. 1 and/or includes one or more interfaces not illustrated in FIG. 1, such as a universal serial bus (USB) interface or any other interface suitable for connecting the host assembly 102 to the wireless assembly 104

The wireless assembly 104 includes a plurality of wireless communication interface units 110, and each of the wireless communication interface units 110 is configured to operate according to a respective wireless communication protocol. In the example embodiment of FIG. 1, the wireless communication interface units 110 include a wireless local area network (WLAN) unit 110-1 configured to operate according to a WLAN communication protocol, such an IEEE 802.11 communication protocol, a Bluetooth (BT) unit 110-2 configured to operate according to a BT communication protocol, a frequency modulation (FM) radio unit 110-3 configured to operate according to an FM radio communication protocol, and a near field communication (NFC) unit 110-4 configured to operate according to a suitable NFC communication protocol. In other embodiments, the wireless assembly 104 omits one or more of the modules 110 illustrated in FIG. 1 and/or includes one or more wireless interfaces not illustrated in FIG. 1, such as a worldwide interoperability for microwave access (WiMAX) interface or any other suitable interface configured to enable communication between the wireless assembly 104 to any suitable communication network and/or a device connected to a communication network.

The wireless assembly 104 further includes one or more interface units 112, corresponding to the one or more interface units 108 of the host assembly 102, that connect the wireless assembly 104 to the host assembly 102. In the example embodiment of FIG. 1, the host interface units 112 include a secure digital input/output (SDIO) interface 112-1, a universal asynchronous receiver/transmitter (UART) interface 112-2 and a peripheral component interconnect express (PCIE) interface 112-3. In other embodiments, the wireless assembly 104 omits one or more of the interfaces 112 illustrated in FIG. 1 and/or includes one or more interfaces not illustrated in FIG. 1, such as a universal serial bus (USB) or any other interface suitable for connecting the wireless assembly 104 to the host assembly 102.

The wireless assembly 104 further includes one or more central processing units (CPUs) 114 and a system bus 116 that interconnects the CPUs 114 with other components of the wireless assembly 104. It is noted that not all connections to the system bus 116 are shown to avoid obscuring the figure. For example, each of the host interface units is coupled to the system bus 116, in an embodiment. In an embodiment, the one or more CPUs 114 are configured to control operation of the wireless communication interface units 110 and generally perform functions associated with the wireless interfaces 110, such as transmit and receive data units (e.g., packets) via the wireless interfaces 110. In one embodiment, a first CPU (e.g., the CPU 114-1) controls operation of and generally performs functions associated with the WLAN unit 110-1, and a second CPU (e.g., the CPU 114-2) controls operation of and generally performs functions associated with the each of the BT unit 110-2, the FM unit 110-3, and the NFC unit 110-4, each of which requires less processing bandwidth compared to the processing bandwidth needed to operate the WLAN module 110-1. In other embodiments, control of the interface units 110 is divided between the CPUs 114 in other suitable manners. Further, although the wireless assembly 104 is illustrated in FIG. 1 as including two CPUs 114, the wireless assembly 104 includes a single CPU responsible for control of all of the wireless communication interface units 110, in some embodiments. In still other embodiment, the wireless assembly 104 includes other suitable numbers (e.g., 3, 4, 5, 6 etc.) of CPUs 114.

According to an embodiment, the wireless communication interface units 110 and the host interface units 112 are hardware components of the wireless assembly 104, such as processor/ASIC components or other digital or analog components of the wireless assembly 104, and these components are sometimes, individually or collectively, referred to herein as "hardware domain components" 118, for convenience. On the other hand, the CPU(s) 114 and the system bus 116 are generally software components, such as processors configured to implement computer readable instructions stored in a memory (e.g., as in the case of the CPU(s) 114) and to transfer data between various components of the wireless assembly 104 (e.g., as in case of the system bus 116), and these components are sometimes, individually or collectively, referred to herein referred to herein as "software domain components" 119, for convenience.

In various embodiments, supply voltage needed by a particular hardware domain component 118, or a particular software domain component 119, depends on activity of the particular component 118, 119. For example, in an embodiment, each of the wireless communication interface units 110 is capable of operating in an active mode or in a sleep mode. Generally, a wireless interface unit 110 requires a different supply voltage to properly operate in the active mode compared to a supply voltage needed to properly operate in the sleep mode, in an embodiment. Further when operating in active mode, the supply voltage actually required by a wireless interface unit 110 depends on the particular function being performed by the wireless interface unit 110, in an embodiment. As just an example, in sleep mode the WLAN unit 110-1 can be operated with a supply voltage having a first value (e.g., 0.8V, 0.9V, or any other suitable value) and in active mode the WLAN unit 110-1 requires a supply voltage having a second value, for example a value in between 1V and 1.15V, for example, with particular voltage depending on the particular function being performed by the WLAN unit 110-1, in an embodiment. For example, the WLAN unit 110-1 requires a supply voltage of 1.15V when receiving a data unit, but needs a supply voltage of only 1.1V to transmit a data unit, in an embodiment. Similarly, as another example, a supply voltage needed by the BT unit 110-2 to transmit a data unit is a first value, such as 1.0V, and a supply voltage needed by the BT unit 110-2 to perform a communication channel scan is a second value, such as 0.9V, in an embodiment.

In an embodiment, supply voltage required by an interface module 112 depends on current functions that the host assembly 102 is performing via the interface module 112, in an embodiment. For example, a supply voltage required by the PCIE interface 112-3 to receive a data unit from the processor 106 of the host assembly 102 for transmission via the WLAN unit 110-1 is different than (e.g., higher than) a supply voltage required by the PCIE interface 112-3 when the host processor 106 is asleep or is currently communicating with the wireless assembly 104 via an interface other than the PCIE interface 112-1. Similarly, the supply voltage required by each of the CPUs 114 and the system bus 116 depends on the current mode, or state, of the CPU 114, the activity or activities being performed by the CPUs 114, activity of the system bus 116, etc., in some embodiments. Further still, a CPU 114 and/or the system bus 116 requires a different clock frequency to perform one activity, such as to transmit a legacy data unit (e.g., a packet that conforms to a legacy communication protocol), than to perform another activity, such as to transmit a non-legacy data unit (e.g., a packet that conforms to a non-legacy communication protocol).

In various embodiments described below, the supply voltage of the wireless assembly 104 and/or clock frequencies provided to the software domain components 119 of the wireless assembly 104 are dynamically adjusted based on current mode of operation and/or the current activities being performed by the various components of the wireless assembly 104. Dynamically adjusting the supply voltage and/or clock frequency being provided to the wireless assembly 104 according to the actual needs of various components of the wireless assembly 104 significantly reduces power consumed by the wireless assembly 104, in at least some embodiments.

In an embodiment, the wireless assembly 104 includes a dynamic power management unit, such as dynamic voltage and frequency scaling (DVFS) unit 120, configured to efficiently control the supply voltage of the wireless assembly 104 and/or clock frequencies supplied to the software components 119 of the wireless assembly 104. In the embodiment of FIG. 1, the DVFS unit 120 is coupled to a voltage regulator 126 that provides a supply voltage to the wireless assembly 104 and to a frequency controller 128 that provides clock signals to the various software components 119 of the wireless assembly 104. In an embodiment, the DVFS unit 120 is implemented at least partially as hardware, a processor implementing firmware instructions, or some combination thereof. For example, the DVFS unit 120 is implemented as a custom integrated circuit, an application-specific integrated circuit (ASIC), etc., in some embodiments. The voltage regulator 126 is a buck voltage regulator, in one embodiment. In other embodiments, the voltage regulator 126 is another suitable voltage regulator, such as a low dropout (LDO) regulator, for example. The frequency control unit 128 includes logic for selecting a signal to control the clocks of the CPUs 114 and/or the clock of the system bus 116, in an embodiment.

Generally speaking, the DVFS unit 120 is configured to monitor activity of various components of the wireless assembly 104 and to dynamically adjust the level of the supply voltage supplied to the wireless assembly 104 based on the activity of the components of the wireless assembly 104, in an embodiment. Additionally, the DVFS unit 120 is configured to adjust clock signals supplied to the software components 119 of the wireless assembly 104 based on activity of the software components 119, in an embodiment. Depending on the embodiment, the DVFS unit 120 is configured to receive one or more of (i) a set of one or more signals 122-1 from the one or more communication modules 110, the one or more signals 122-1 indicative of current activity of the one or more communication modules 110, (ii) a set of one or more signals 122-2 from the one or more interface modules 112, the one or more signals 122-2 indicative of current activities that the host assembly 102 performs (or will soon need to perform) via the one or more interface modules 112, and (iii) a set of one or more signals 122-3 from the one or more CPUs 114 and/or the System Bus 116, the one or more signals 122-3 indicative of current activity of the CPUs 114 and/or the system bus 116. In operation, the DVFS unit 120 receives the one or more signals 122-1, 122-2, and/or 122-3 and determines, based on the received one or more signals 122-1, 122-2 and/or 122-3, a supply voltage level currently required by the various components 118, 119 of the wireless assembly 104, according to an embodiment. In an embodiment, the DVFS unit 120 determines, based on respective signals 122-3 received from the software components 119, a clock frequency currently needed by each of the software components 119.

In an embodiment and/or scenario, the DVFS unit 120 generates a signal 124-1 and provides the signal 124-1 to the voltage regulator unit 126 to adjust the supply voltage of the wireless assembly 104 based on current needs of the various components of the wireless assembly 104. Similarly, the DVFS unit 120 generates a respective signal 124-2 for each of the software components 119 and provides the respective signals 124-2 to the frequency control unit 126 to adjust the clock frequencies of the software components 119 based on the current needs of software components 119, in an embodiment and/or scenario.

Because the DVFS unit 120 is provided in the wireless assembly 104 to control the supply voltage of the wireless assembly 104 and the individual clock frequencies of the software components 119 of the wireless assembly 104, the CPU 114-1 and the CPU 114-2 need not perform power save operations of the wireless interface units 110, in at least some embodiments and/or scenarios. Further, because supply voltage of the wireless interface units 110 is controlled by the DVFS unit 120, a wireless interface unit 110 can operate independently from the CPU 114 that is responsible for controlling operation of the wireless interface unit 110, in at least some situations. For example, when an interface unit 110 and the CPU 114 that is generally responsible for controlling operation of the interface unit 110 are both operating in sleep mode, the interface unit 110 can wake up to perform an action independently of the CPU 114 and without waking up the CPU 114. As just one specific example, the BT interface 110-2 can wake up and perform a communication channel scan while the CPU 114-2, generally responsible for operation of the BT interface 110-2, remains asleep, in one example embodiment and scenario. Then, the CPU 114-2 can be woken up on as-needed basis, for example to establish a connection with a device discovered as a result of the scan, in an embodiment.

Figure 2:
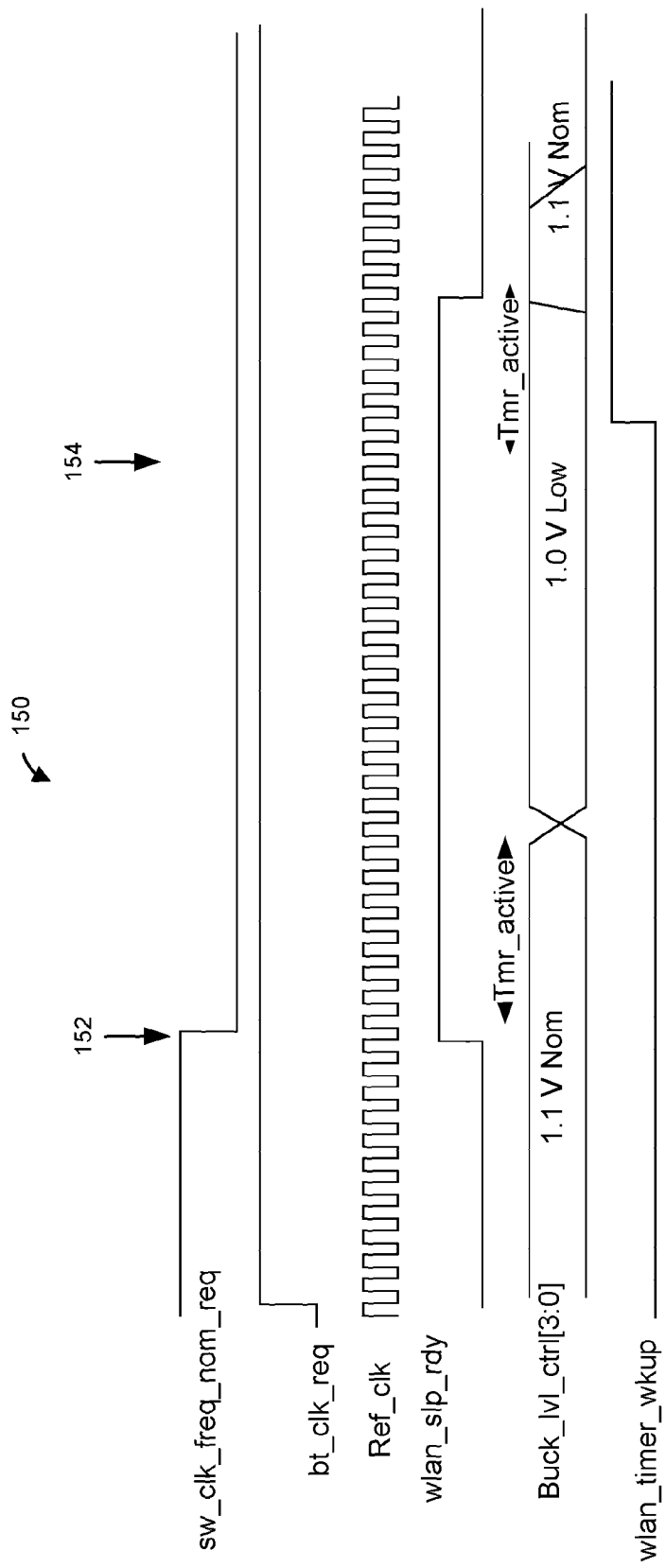
FIG. 2 is a timing diagram illustrating a method of dynamically adjusting supply voltage in a wireless device based on the actual needs of the wireless device, according to an embodiment and scenario.

FIG. 2 is a timing diagram 150 illustrating an embodiment of a method of dynamically adjusting supply voltage in a wireless device based on the actual needs of the wireless device, according to another embodiment and/or scenario. The timing diagram 150 will be described with reference to FIG. 1 for ease of explanation. In other embodiments, however, a suitable device different than the wireless device 100 of FIG. 1 may utilize the method illustrated in FIG. 2.

In FIG. 2, the WLAN interface 110-1 and the BT interface 110-2 are initially operating in active mode. The DVFS unit 120 controls the voltage regulator 126 accordingly to output a nominal voltage of 1.1V. At a time 152, the WLAN interface 110-1 is ready to fall asleep and, accordingly, sends a signal to the DVFS unit 120 indicating to the DVFS unit 120 that the WLAN interface 110-1 is entering sleep mode. The BT interface 110-2, in this scenario, remains active and continues to indicate to the DVFS unit 120 that the interface BT interface 110-2 is operating in active mode. In response to receiving the signal, the DVFS unit 120 determines that the supply voltage for the wireless assembly 104 can now be lowered to 1.0V corresponding to active mode of the BT interface 110-2, and controls the voltage regulator 126 accordingly to lower the output voltage of the voltage regulator 126 to 1.0V. Subsequently, at a time 154, the WLAN interface 110-1 wakes up, for example to communicate with an access point to determine whether the access point has any data to send to the wireless device 100. The DVFS unit 120 receives a signal from the WLAN interface 110-1 indicating that the WLAN interface 110-1 is waking up, and determines that the supply voltage of the wireless assembly 104 needs to now be raised to the nominal 1.1V corresponding to the active state of the WLAN interface 110-1. The DVFS unit 120 controls the voltage regulator 126 accordingly to bring the output voltage of the voltage regulator 126 back to 1.1V.

Figure 3:
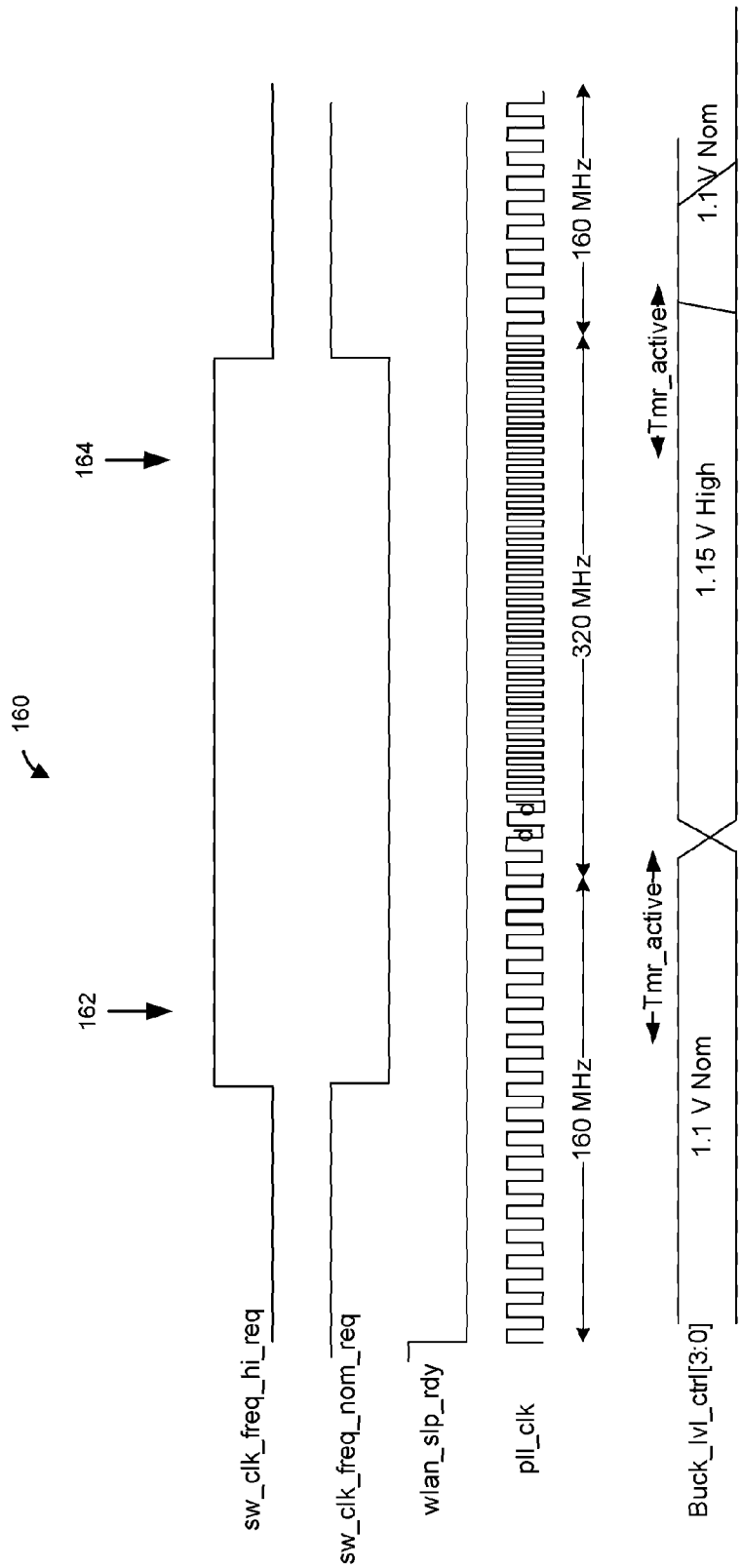
FIG. 3 is a timing diagram illustrating a method of dynamically adjusting supply voltage and clock frequency in a wireless device based on the actual needs of the wireless device, according to another embodiment and scenario.

FIG. 3 is a timing diagram 160 illustrating an embodiment of a method of dynamically adjusting supply voltage in a wireless device based on the actual needs of the wireless device, according to another embodiment and/or scenario. The timing diagram 160 will be described with reference to FIG. 1 for ease of explanation. In other embodiments, however, a suitable device different than the wireless device 100 of FIG. 1 may utilize the method illustrated in FIG. 3.

In FIG. 3, the WLAN interface 110-1 is initially running at a nominal voltage of 1.1V and is operating in legacy mode. In this mode, the clock frequency of the CPU 114-1, which control operation of the WLAN interface 110-1, is set to 160 MHz, for example. At a time 162, the WLAN interface 110-1 wishes to enter non-legacy mode, for example to transmit a non-legacy packet. The WLAN interface 110-1 informs the DVFS unit 120 accordingly to indicate to the DVFS unit 120 that the clock frequency of the CPU 114-1 needs to be increased to a clock frequency needed for non-legacy mode operation, such as 320 MHz, for example. The DVFS responds by controlling the voltage output of the voltage regulator 126 to increase to 1.15V needed for operation of the CPU 114-1 at the 320 MHz clock, and controlling the frequency controller 128 to increase the clock frequency to 320 MHz. In an embodiment, the DVFS unit 120 ensures that the higher voltage level of 1.15V has been reached by the voltage regulator 126 prior to controlling the frequency controller 128 to increase the clock frequency to 320 MHz.

Subsequently, at a time 164, the WLAN interface 110-1 wishes to go back to legacy mode. In this mode, the clock frequency of the CPU 114-1 can again be set to 160 MHz. The WLAN interface 110-1 informs the DVFS unit 120 accordingly to indicate to the DVFS unit 120 that the clock frequency of the CPU 114-1 can be decreased to 160 MHz. The DVFS responds by controlling the voltage regulator 126 to decrease the output of the voltage regulator 126 to 1.10V needed for operation of the CPU 114-1 at 160 MHz clock, and controlling the frequency controller 128 to set the clock frequency to 160 MHz. In this case, the supply voltage level is lowered, rather than raised, relative to the previous voltage level, and the DVFS unit 120 need not ensure that the new voltage level is reached by the voltage regulator 126 prior to controlling the frequency controller 128 to decrease the clock frequency to 160 MHz. Accordingly, in the embodiment of FIG. 3, the DVFS unit 120 controls the frequency controller 128 to decrease the clock frequency to 160 MHz prior to the transition of the voltage level to 1.1V has been completed by the voltage regulator 128, in the illustrated scenario.

Figure 4:
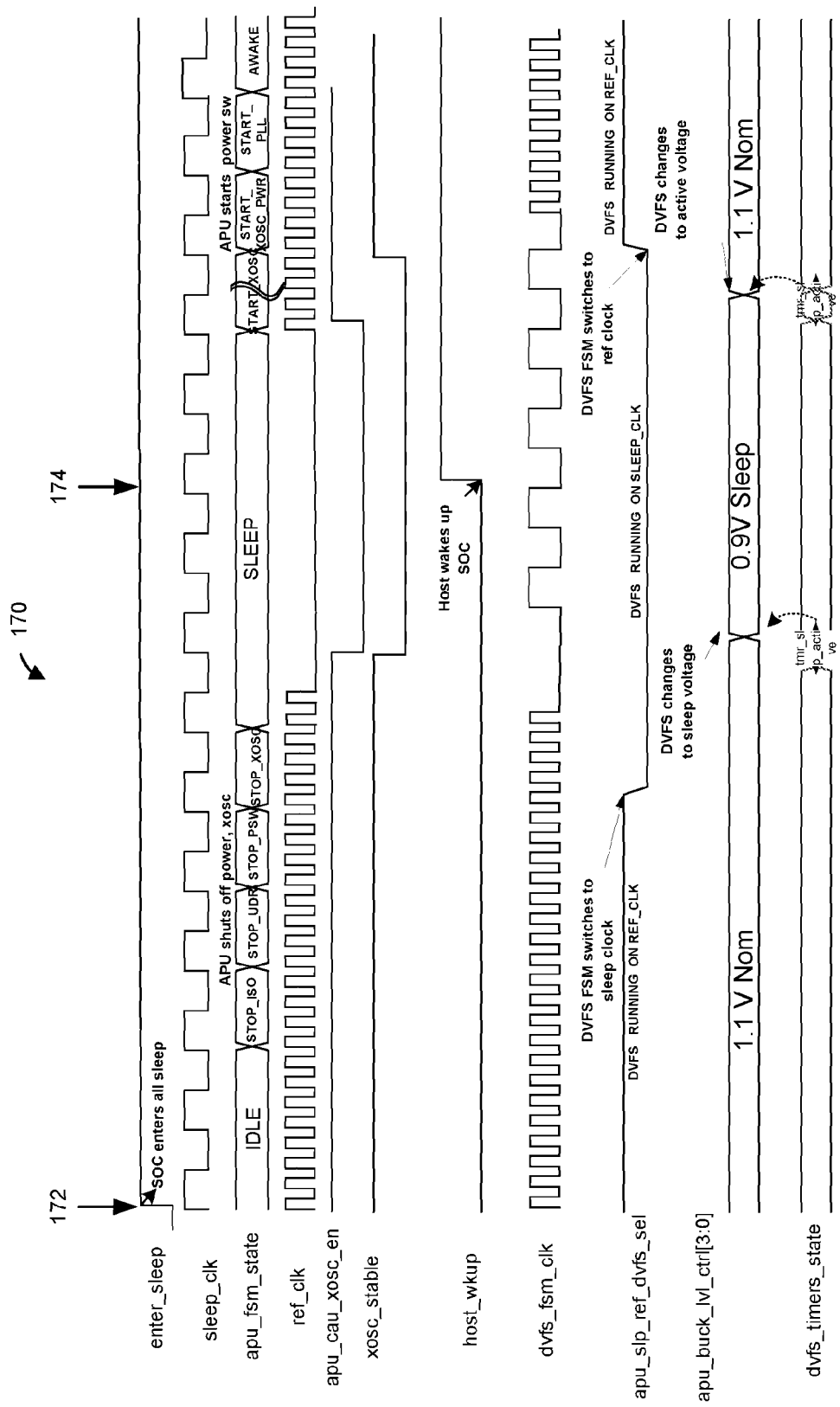
FIG. 4 is a timing diagram illustrating a method of dynamically adjusting supply voltage in a wireless device based on the actual needs of the wireless device, according to an embodiment and scenario.

FIG. 4 is a timing diagram 170 illustrating an embodiment of a method of dynamically adjusting supply voltage in a wireless device based on the actual needs of the wireless device, according to an embodiment. The timing diagram 170 will be described with reference to FIG. 1 for ease of explanation. In other embodiments, however, a suitable device different than the wireless device 100 of FIG. 1 may utilize the method illustrated in FIG. 4.

In FIG. 4, the wireless assembly 104 is initially powered at a nominal voltage of 1.1V. At time 172, the wireless assembly 104 enters sleep mode in which the interfaces 110, 112, the CPUs 114 and the system bus 116 can operate at a sleep voltage, which in the case of FIG. 4 is 0.9V. Accordingly, the DVFS unit 120 controls the voltage regulator 126 to produce the sleep voltage of 0.9V. Then, at a time 174, the host assembly 102 wakes up the wireless assembly 104 and sends a signal to the DVFS unit 120 indicating to the DVFS unit 120 that a nominal voltage level is requested by the host assembly 102. In response to receiving the signal from the host assembly 102, the DVFS unit 120 controls the voltage regulator 126 to produce the requested nominal voltage of 1.1V. The nominal voltage of 1.1V allows the wireless assembly 104 to now operate in active state, in an embodiment.

Figure 5:
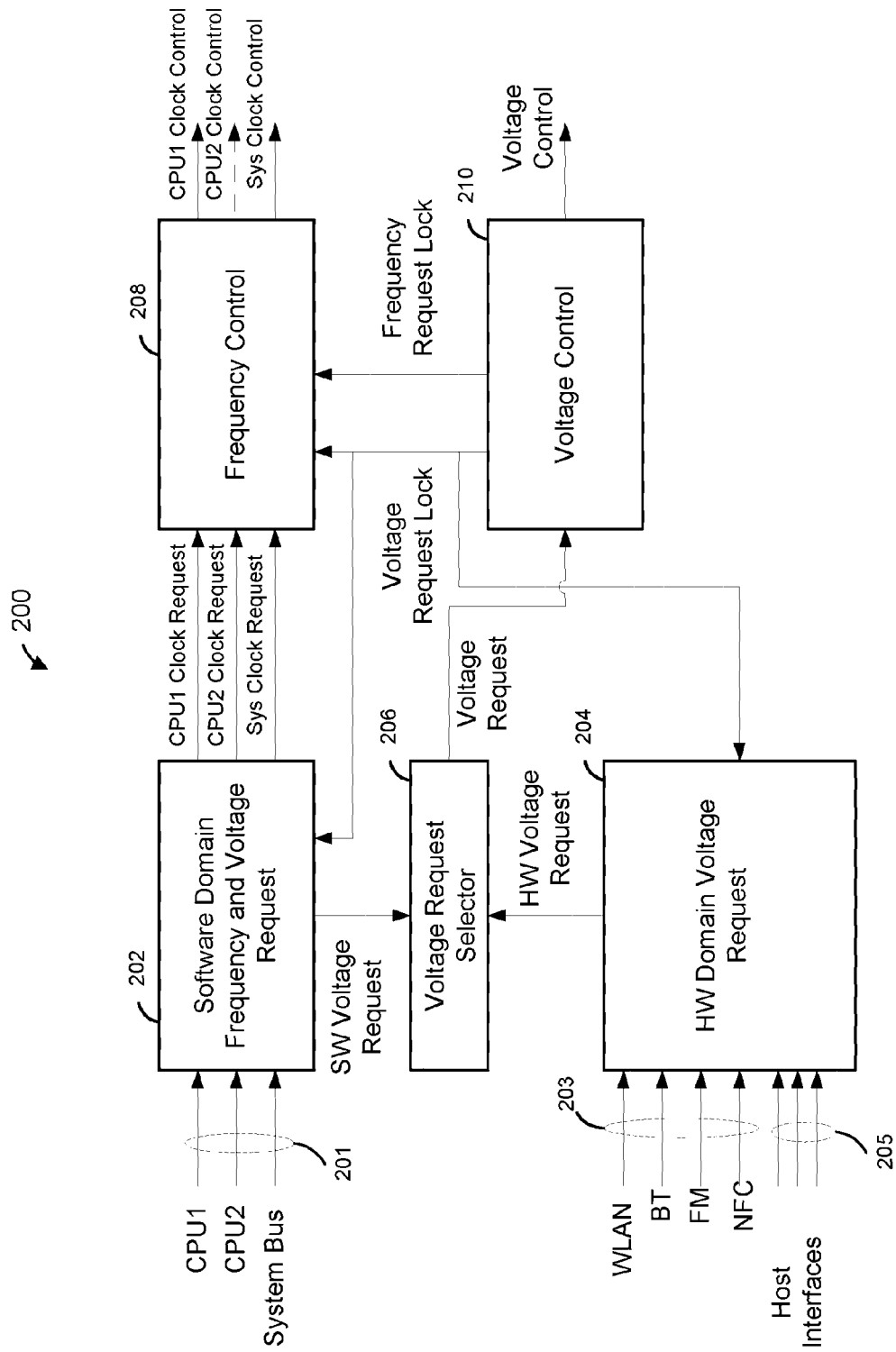
FIG. 5 is a block diagram of an example implementation of a dynamic voltage and frequency scaling system, according to an embodiment.

FIG. 5 is a block diagram of an example implementation of a dynamic voltage and frequency scaling system 200, according to an embodiment. In an embodiment, the DVFS unit 120 of FIG. 1 implements the DVFS system 200. In other embodiments, the DVFS system 200 is implemented at least partially by another suitable component of the wireless device 100, or is implemented by a suitable device other than the wireless device 100. Similarly, the DVFS module 102 and/or another component of the wireless device 100 implements a DVFS system other than the DVFS system 200. For ease of explanation, the system 200 is described below with reference to FIG. 1.

The DVFS system 200 includes a software domain voltage and clock frequency request unit 202 and a hardware domain voltage request unit 204. According to an embodiment, the software domain frequency and voltage request unit 202 monitors activity of software domain components 119 of the wireless assembly 104, such as the CPU(s) 114 and/or system bus 116 of the wireless assembly 104, and generates a voltage request signal and respective clock frequency request signals based on the activity of the software components 119 of the wireless assembly 104. In an embodiment, the software domain frequency and voltage request unit 202 receives, from each of the software component 119, a respective signal 201 indicative of the current activity of the software domain component 119. As an example, in an example scenario, when the CPU 114-1 and the CPU 114-2 are operating in sleep mode and the system bus 116 is not being utilized, the respective signals 201 received by the software domain voltage and clock frequency request generator 202 indicate that both of the of the CPU 114-1 and the CPU 114-2 are currently asleep, and that the system bus 116 is not being utilized. In this case, the unit 202 determines that the voltage level currently required for operation of the software components 119 of the wireless assembly 104 is a sleep mode voltage, such as e.g., 0.9V, and generates a voltage request to indicate the determined voltage currently required for operation of the software domain components 119. Additionally, continuing with the same embodiment and scenario, the unit 202 determines that a clock frequency needed to properly operate each of the software components is a nominal clock frequency, such as 30 MHz, for example, and generates respective clock frequency requests corresponding to each of the software components 119. In another example scenario, the unit 202 receives from the CPU 114-1 a signal indicating that the CPU 114-1 is operating in an active mode and is performing (or is preparing to perform) a certain WLAN action, such as transmitting a packet via the WLAN interface 110-1, and receives from the CPU 114-2 a signal 201 indicating that the CPU 114-2 is operating in an active mode and is performing (or is preparing to perform), a certain BT action, such as transmitting a packet via the BT interface 110-2. In this case, the unit 202 determines a voltage level required by the CPU 114-1 based on the current activity of the CPU 114-1, determines a voltage level required by the CPU 114-2 based on the current activity of the CPU 114-2, and generates a software domain voltage request to indicate the greater one of the determined voltage levels, in an embodiment. Similarly, the unit 202 determines a clock frequency required by the CPU 114-1 based on the current action being performed by the CPU 114-1, determines a clock frequency required by the CPU 114-2 based on the current action being performed by the CPU 114-2, and generates respective clock frequency requests indicating respective clock frequencies needed by the CPU 114-1 and the CPU 114-2, in an embodiment.

Figure 6:
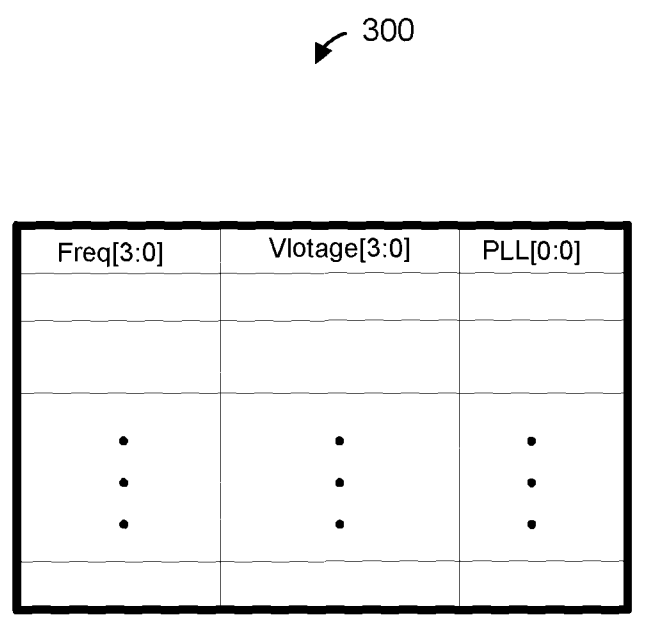

In an embodiment, the software domain frequency and voltage request unit 202 determines the supply voltage and the clock frequency needed by a software domain component 119 (e.g., a CPU 114, the system bus 116) based on a signal received from the software domain component by accessing a clock and voltage table, stored in a memory, for example using an index corresponding to the activity indicated by the signal. Referring briefly to FIG. 6, an example embodiment of a frequency and voltage table 300 corresponding to a software domain component 119 (e.g., the CPU 114-1) is shown. In an embodiment, the software domain frequency and voltage request unit 202 is configured to access a respective frequency and voltage table, such as the table 300, for each one of the software components 119 to determine supply voltage and clock frequency needed for a software component 119 based on activity of the software component 119. The respective clock and voltage tables 300 corresponding to the software components 119 are configured during initialization of the wireless assembly 104 to store respective entries associated with operation of the software domain components 119, in an embodiment.

With continued reference to FIG. 6, each entry of the table 300 corresponds to an activity of the software component 119 and includes a clock frequency field to indicate a clock frequency needed for the activity and a voltage level field to indicates a supply voltage needed for the activity. Additionally, each entry of the table 300 includes a clock source indicator to indicate whether the frequency to be supplied to the software domain component 119 is to be generated by a phase-locked loop (PLL) externally supplied to the software domain component 119 or by a clock frequency generator internal to the software component 119 that generates the clock by scaling a reference clock provided to the software component 119, in an embodiment. In an embodiment, the table 300 includes sixteen entries and defines supply voltage levels and clock frequencies needed for sixteen activities of the software component 119. In other embodiments, the table 300 includes other suitable numbers of entries and is capable of indicating voltage and clock frequencies corresponding to other numbers of activities of the software component 119. In the embodiment of FIG. 6, each clock frequency and each voltage level in the table 300 is indicated by a 4-bit value, however this need not be the case, and each clock frequency and/or each voltage value in the table 300 is indicated by another suitable number of bits, in other embodiments. The unit 202 accesses the table 300 using an index generated based on activity signals that the unit 202 receives from the software components 119, and retrieves a supply voltage level and a clock frequency currently needed by the software component 119 for performing the activity indicated by the corresponding activity signal, and the source to be used for supplying the clock frequency to the software domain component, in an embodiment.

Referring again to FIG. 5, clock frequency requests generated by the software domain unit 202 are provided to a frequency control unit 208. The frequency control unit 208 generally supplies the frequency requests to the frequency controller 128, in an embodiment. As will be explained in more detail below, the frequency control unit 208 ensures that a voltages needed by a software component that requested the clock frequency to operate at the requested clock frequency is provided to the software component prior to supplying the frequency request to the frequency controller 128, in an embodiment.

The hardware domain voltage request unit 204 operates in a manner similar to the software domain unit 202 to determine a voltage value currently needed for operation of the hardware components 118 of the wireless assembly 104 based on activity of the hardware components 118, in an embodiment. In an embodiment, hardware domain voltage request unit 204 receives, for each of the hardware components 118, a respective signal 203, 205 indicative of activity of the hardware component 118, and generates a voltage request signal indicative of a maximum supply voltage currently needed for operation of the hardware components 118 based on current needs of the hardware domain components 118. For example, the unit 204 access an appropriate voltage table, similar to the table 300 of FIG. 6, that stores associations between different activities of the hardware domain components 118 and supply voltage levels that need to be supplied to the hardware component 118 to allow the hardware component 118 to properly perform these actions, and selects a maximum voltage level currently needed by the hardware components 118 indicated by the respective voltage tables corresponding to the hardware components 118, in an embodiment.

The software domain voltage request generated by the unit 202 and the hardware domain voltage request generated by the unit 204 are provided to a voltage request selector 206, which selects a voltage level currently needed to be supplied by the wireless assembly 104, in an embodiment. For example, the voltage request selector selects the greater one of the software domain component voltage request received from the unit 202 and the hardware domain component voltage request received from the unit 204, in an embodiment. In an embodiment, the voltage selector 206 is configured to ignore voltage requests from the software domain unit 202 and the hardware domain unit 204 during transitions of the voltage regulator 126. That is, the voltage selector 206 is blocked from generating a new voltage request unit a previous voltage request has been met by the voltage regulator 126, in this embodiment.

The voltage selector 206 provides the new voltage request to a voltage control unit 210, according to an embodiment. The voltage control unit 210 receives the voltage request from the selector 206 and determines whether the voltage request is less than, equal to, or greater than, the voltage currently being output by the voltage regulator 126. In response to determining the voltage request is less than or greater than the current output of the voltage regulator 126, the unit 210 initiates an adjustment of the voltage regulator 126, and blocks new requests from the selector 206 until the adjustment has been completed and the new voltage has been reached by the voltage regulator 126, in an embodiment. Further, the voltage selector 206 generates respective signals for each of the components 118, 119 to indicate that a voltage requested by the component 118, 119 has been reached by the voltage regulator 126, thereby indicating to the components 118, 119 that the requested actions by the components 118, 119 can now be performed, in some embodiments. In an embodiment, the voltage control unit 210 prevents a new clock frequency from being supplied to a software component 119 until a voltage level needed by the software component 119 has been reached by the voltage regulator 126, at least in situations in which the new clock frequency is higher relative to the current clock frequency provided to the software component 119. For example, the voltage control unit 210 provides a signal to the frequency control unit 208 that blocks the frequency control unit 208 from sending a clock frequency request to the frequency selector 128 when the output voltage of the voltage regulator 126 is less than the voltage needed by the software component 119 that needs the clock frequency, and unblocks the frequency control unit 208 when the voltage level needed by the software component 119 has been reached by the voltage regulator 126, in an embodiment. In at least some embodiments, the voltage control unit 210 also generates a voltage request lock signal and provides the voltage request lock signal to each one of the software domain frequency and voltage request unit 202, the hardware domain voltage request unit 204 and the frequency control unit 208. The voltage request lock signal blocks processing of a new voltage request until a transition to a previously requested voltage has been completed by the voltage regulator 126, in an embodiment. The voltage request lock signal also blocks processing of a new clock frequency request until a voltage needed for or at least sufficient for operation under the new clock frequency has been reached by the voltage regulator 126, in an embodiment.

Figure 7A:
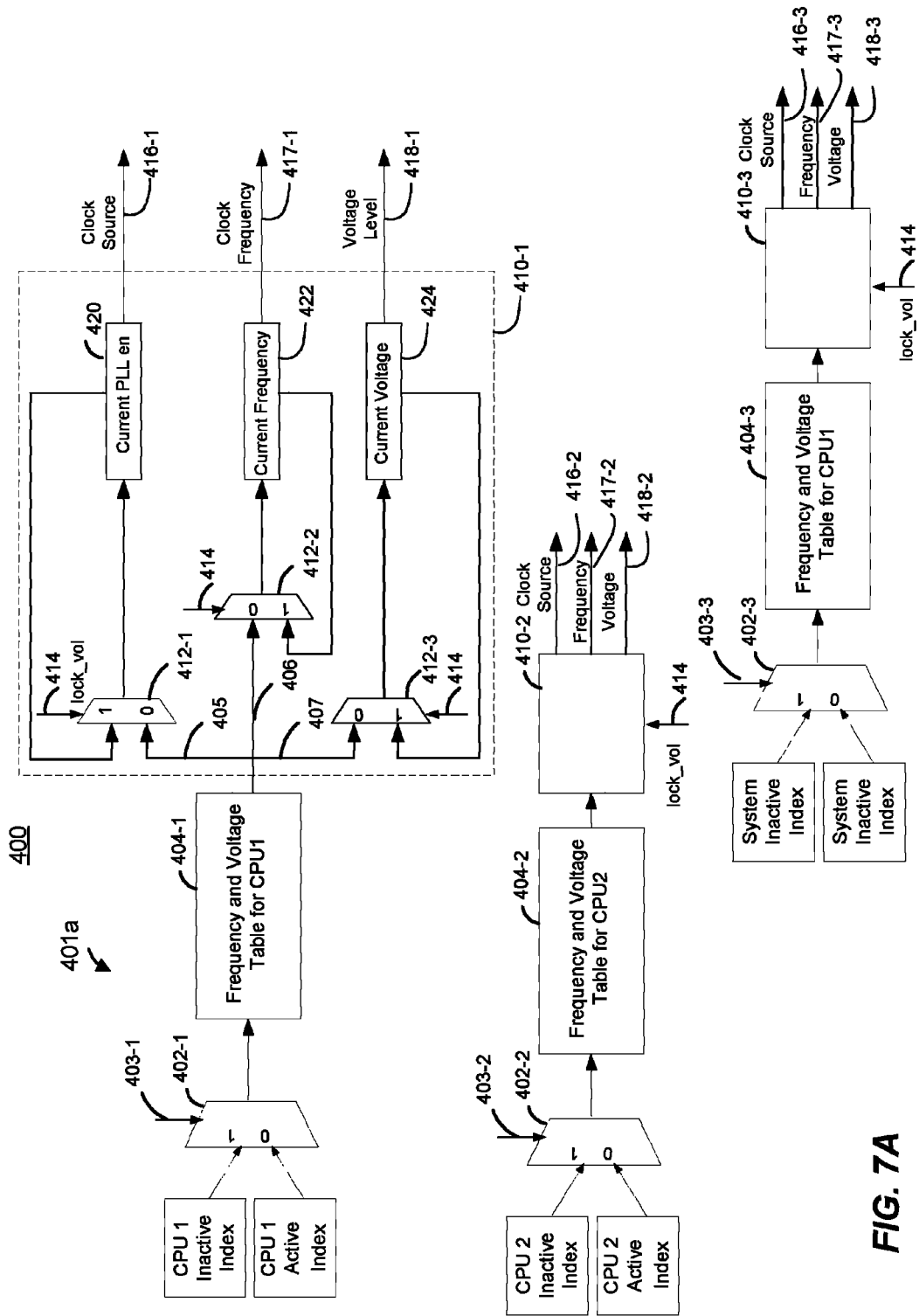
FIGS. 7A-7B are block diagrams of various portions of an example implementation of a software domain voltage and frequency request unit, according to an embodiment.
Figure 7B:
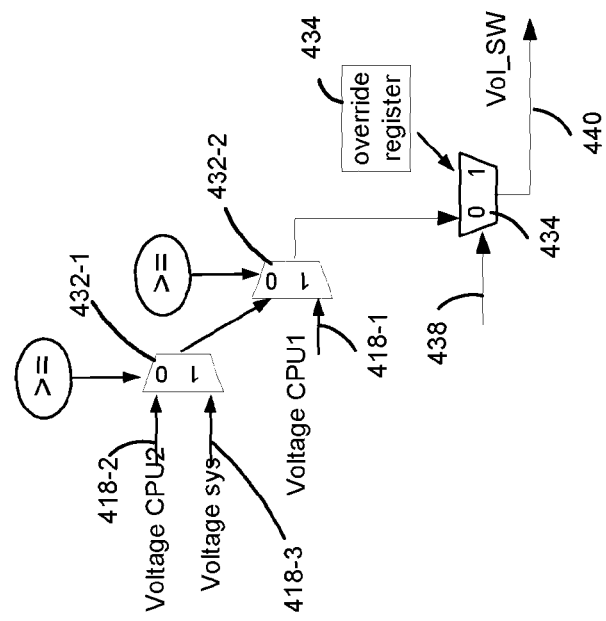

FIGS. 7A-7B are block diagrams illustrating an example implementation of a software domain voltage and frequency request unit 400 suitable for use as the software domain voltage and frequency request unit 202 of FIG. 5, according to an embodiment. For ease of explanation, the software domain voltage and frequency request unit 400 will be described below with reference FIGS. 1 and 5. However, the software domain voltage and frequency request unit 400 is used by systems other than the system 200 of FIG. 5 and/or by wireless devices other than the wireless device 100 of FIG. 1, in other embodiments. Similarly, the system 200 and/or the wireless device 100 utilize software domain voltage and frequency request units other than the unit 400, in other embodiments.

FIG. 7A is a block diagram of a frequency and voltage request portion 401a of the unit 400, according to an embodiment. The frequency and voltage request portion 401a includes one or more selections units, such as multiplexers, 402 that select a respective index corresponding to activity of each of one or more software components 119 based on signals received from the corresponding software components 119. In the embodiment of FIG. 7, the frequency and voltage request portion 401a includes a first multiplexer (MUX) 402-1 that selects an activity index corresponding to activity of the CPU 114-1, a second MUX 402-2 that selects an activity index corresponding to activity of the CPU 114-2 and a third MUX 402-3 that selects an activity index corresponding to activity of the system bus 116. The multiplexers 402 are controlled by respective signals 403 that indicate the current operating state (e.g., active or inactive, or sleep) of the CPU114-1, CPU 114-2 and system bus 116, respectively, to select a sleep mode index or an active mode index corresponding to current activity of the CPU114-1, CPU 114-2 and system bus 116. The outputs of the multiplexers 402 are provided to appropriate ones of the frequency and voltage table 404 to determine a clock frequency and a corresponding voltage level needed by each of the CPU 114-1, the CPU 114-2 and the system bus 116 based on the index corresponding to current activity of the CPU 114-1, the CPU 114-2 and the system bus 116, in an embodiment. The frequency and voltage tables 404 are formatted the same as or similar to the voltage and frequency table 300 of FIG. 3, in an embodiment. In other embodiments, other suitable voltage and frequency table formats are utilized by the table 404.

In some embodiments, the signals indicative of current activity of the software components 119 are provided from the software components 119 to the unit 400 at a clock rate that is greater than the clock rate used for operating the unit 402. For example, the unit 400 operates at a lowest system clock rate, such as a "sleep" clock rate or a "reference" clock rate, while the software components 119, in at least some situations, operate at a clock rate that is higher than the lowest system clock rate and provide signals indicative of activity of the software components 119 to the unit 400 at the clock rate that is higher than the lowest system clock rate, in an embodiment. According to an embodiment, the frequency and voltage request portion 401a of the unit 400 includes a syncing block (not shown) to ensure that the indices corresponding to activities of the software components 119 are provided to the voltage and frequency tables 404 in sync with the clock rate used by the unit 402. The frequency and voltage request portion 401a is configured to ignore the requests that the unit 400 receives from the software component 119 during syncing of previously received requests from the software components 119, in an embodiment.

A table 404 corresponds to a particular software component 119 and outputs an entry defining clock frequency and voltage for the software component 119 selected based on current activity of the software component 119. Outputs of the tables 404 are provided to respective request block units 410 to block new requests during voltage transitions of the voltage regulator 126. FIG. 7A illustrates an example implementation of a request processing unit 410-1, corresponding to the CPU 114-1, according to an embodiment. It should be understood that request processing units 410-2, 410-3, corresponding, respectively, to the CPU 114-2 and the system bus 116, include components same as or similar to the components of the request processing unit 410-1 and operate in a manner same as or similar to the request processing unit 410-1, in an embodiment.

The request processing unit 410-1 includes several multiplexers (MUXs) 412 which are controlled by respective voltage request lock signals 414 to set respective output signals 416-1, 417-1, 418-1 of the unit 410-1 to a respective new value retrieved from the table 404-1 when new requests are not blocked by the voltage request lock signal 414, or to maintain the output signals 416 at respective current values (e.g., corresponding to a previous request) when new requests are blocked by the voltage request lock signal 414, in an embodiment. In an embodiment, the voltage request lock signal 414 is generated by the voltage control unit 210, an example implementation of which will be described in more detail below with respect to FIG. 9.

With continued reference to FIG. 7A, a first MUX 412-1 receives as a first input a new clock source request signal 405 indicative of a new clock source retrieved from the table 404-1, and receives as a second input a current clock source indicated by a value stored in a clock source register 420. The output of the MUX 412-1 is provided to the register 420. The MUX 412-1 sets the clock source signal 416-1 to the value indicated by the new clock source signal 405 when new requests are not blocked by the voltage request lock signal 414, and maintains the clock source signal 416-1 at a current clock source indication (e.g., corresponding to a previous request) when new requests are blocked by the voltage request lock signal 414, in an embodiment.

A second MUX 412-2 receives as a first input a new clock frequency request signal 406 indicative of a new clock frequency retrieved from the table 404-1, and receives as a second input a value of the current clock frequency stored in a register 422. The output of the MUX 412-2 is provided to the register 422. The MUX 412-2 sets the frequency request signal 417-1 to the value indicated by the new clock frequency signal 406 when new requests are not blocked by the voltage request lock signal 414, and maintains the clock frequency request signal 417-1 at the current clock frequency (e.g., corresponding to a previous request) when new requests are blocked by the voltage request lock signal 414, in an embodiment.

A third MUX 412-3 receives as a first input a new voltage request signal 407 indicative of a new voltage level retrieved from the table 404-1, and receives as a second input a value of the current voltage level stored in a voltage register 424. The output of the MUX 412-3 is provided to the register 424. The MUX 412-3 sets the voltage request signal 418-1 to the new voltage level indicated by the new voltage request signal 405 when new requests are not blocked by the voltage request lock signal 414, and maintains the voltage request signal 418-1 at the current voltage (e.g., corresponding to a previous request) when new requests are blocked by the voltage request lock signal 414, in an embodiment.

In an embodiment, the request processing unit 410-2 processes the output of the frequency table 404-2 corresponding to the CPU 114-2 to generate a clock source signal 416-2, a 417-2, and a voltage level request signal 418-2 corresponding to the CPU 114-2. Similarly, in an embodiment, the request processing unit 410-2 processes the output of the frequency table 404-3 corresponding to the system bus 116 to generate a clock source signal 416-3, a 417-3, and a voltage level request signal 418-3 corresponding to the CPU 114-2.

The clock source signals 416 and the clock frequency signals 417 are provided to for further processing to a frequency control unit that generates respective control signals corresponding to the software components, in an embodiment. An example implementation of a frequency control unit will be discussed in more detail below with reference to FIG. 10.

The voltage level request signals 418 are provided to a voltage selection portion 401b illustrated in FIG. 7B, in an embodiment. The voltage selection portion 401b generates a software voltage request 430 indicative of a voltage level collectively needed by the software components 119. For example, the voltage selection portion 401b selects a maximum voltage level of the voltage levels determined for each of the software components 119 as the voltage level collectively needed by the software components 119, in an embodiment. Referring to FIG. 7B, the voltage selection portion 401b includes several multiplexers 432 that select a maximum one of the voltage levels indicated by the voltage level requests 418. The voltage selection portion 401b also includes a register 434 that stores an override voltage value to be used when reference clock is not supplied to the unit 400, such as when the reference clock is disabled during an all sleep mode of the wireless assembly 104, for example. The maximum voltage value selected by the multiplexers 432 is provided as a first input to a multiplexer 436 and the override value stored in the register 434 is provided as a second input to the multiplexer 434. The multiplexer 434 is controlled by a signal 438 to select either the output of the multiplexers 432-2 or the override value stored in the register 434 depending on whether or not the reference clock is enabled for the unit 400, in an embodiment. In particular, in an embodiment, when the reference clock for the unit 400 is enabled, then the multiplexer 434 selects the output of the multiplexer 432-2, and provides the output of the multiplexer 432-2 as a software voltage request output 440 of the unit 400. On the other hand, when the reference clock used by the unit 400 is disabled, for example during an all sleep mode of the wireless assembly 104, then the multiplexer 414 selects the override value stored in the override resister 434 as the software voltage request output 440 of the unit 400, in this embodiment.

Figure 8:
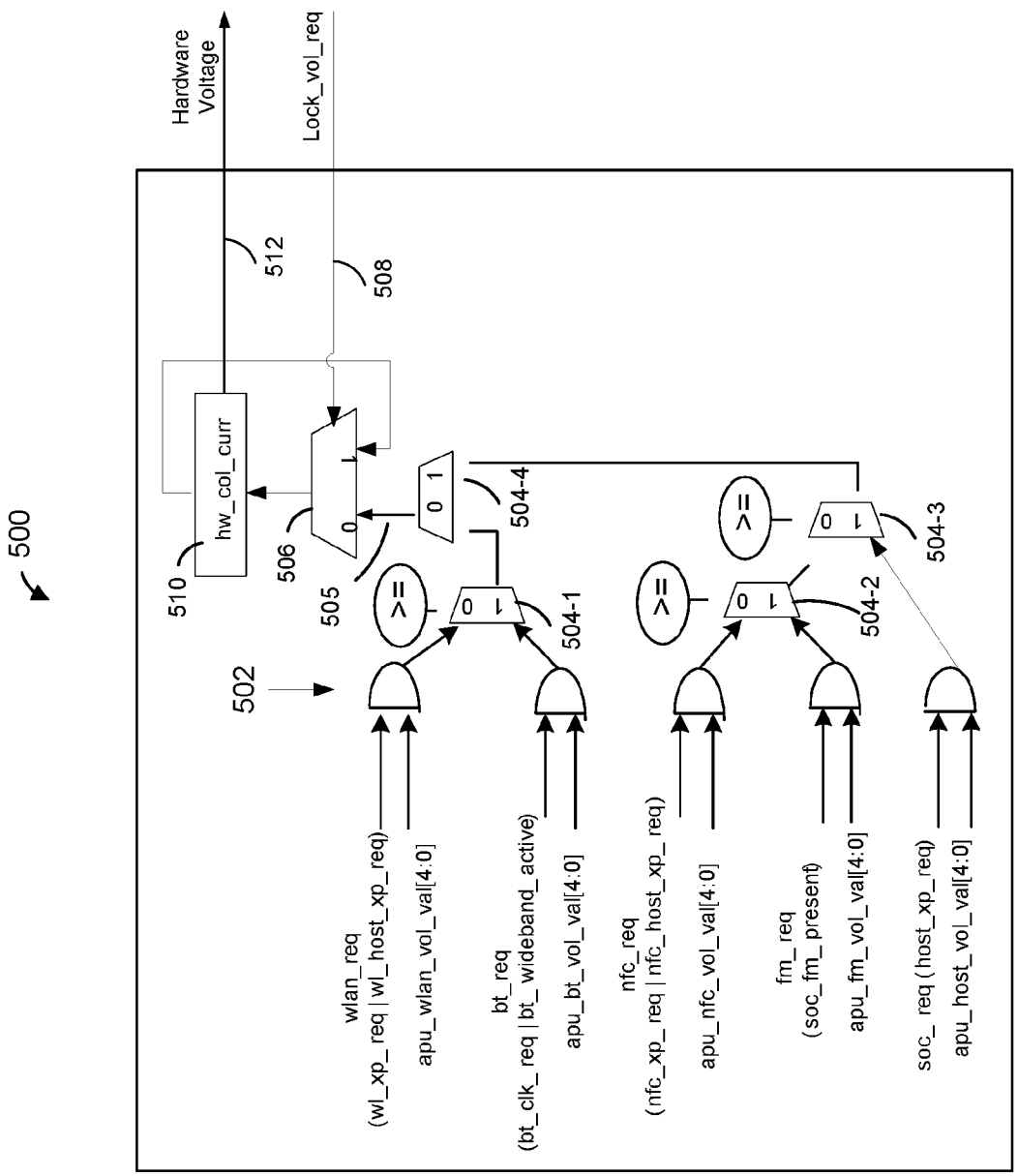
FIG. 8 is a block diagram of an example implementation of a hardware domain voltage request unit, according to an embodiment.

FIG. 8 is a block diagram of an example implementation of a hardware domain voltage request unit 500 suitable for use as the hardware domain voltage request unit 204 of FIG. 5, according to an embodiment. For ease of explanation, the hardware domain voltage request unit 500 will be described below with reference FIGS. 1 and 5. However, the hardware domain voltage request unit 500 is used by systems other than the system 200 of FIG. 5 and/or by wireless devices other than the wireless device 100 of FIG. 1, in other embodiments. Similarly, the system 200 and/or the wireless device 100 utilize hardware domain voltage request units other than the unit 500, in other embodiments.

The hardware domain voltage request unit 500 includes a plurality of conjunctive junctions, such as AND gates, 502 and a plurality of selection modules, such as multiplexers, 504. Each of the AND gates 502 receives a signal indicative of a current or requested state of a respective hardware component 118 and a signal indicative of a voltage level currently requested by the hardware component 118, and, when the current or requested state of the hardware component 118 corresponds to an active state of the hardware component 118, provides the voltage level corresponding to activity of the hardware component 118 to a multiplexer 504. In an embodiment, the unit 500 determines the voltage level corresponding to the voltage request based on an index corresponding to activity of the hardware component 118. For example, the unit 500 accesses a respective voltage table corresponding to each hardware component 118 to determine a voltage request for the hardware component 118, in an embodiment.

The multiplexers 504 receive signals indicative of voltages requested by the hardware components 118 and select the voltage request 505 corresponding to the greatest one of the voltages requested by the hardware components 118. The selected voltage request 505 is provided to a multiplexer 506, which is controlled by a voltage request lock signal generated by a voltage determination unit, such as a voltage determination unit 600 that will be described below with respect to FIG. 6, in an embodiment. In an embodiment, the MUX 506 is controlled by a voltage request lock signal 508 to either block or unblock the requested voltage 505 from being output by the unit 500. In an embodiment, the MUX 506 blocks the requested voltage 505 from being output by the unit 500 until the voltage corresponding to the previous request is reached by the voltage regulator unit 126. In the example implementation depicted in FIG. 8, the unit 500 includes a current hardware request register 510 that holds corresponding to a previous voltage request or a new voltage request to be output by the unit 500. In an embodiment, when the voltage request lock signal 508 is asserted, the MUX 506 selects effectively sets the output voltage request output of the unit 500 to a previously requested voltage stored in the register 510. On the other hand, when the voltage request lock signal 508 is not asserted, the MUX 506 sets the register 510 to the new voltage request 505, thereby effectively setting the voltage request output of the unit 500 to the new voltage request 505, in an embodiment. In an embodiment, the voltage request lock signal 508 corresponds to a voltage request lock signal 603 described blow with respect to FIG. 9.

Figure 9:
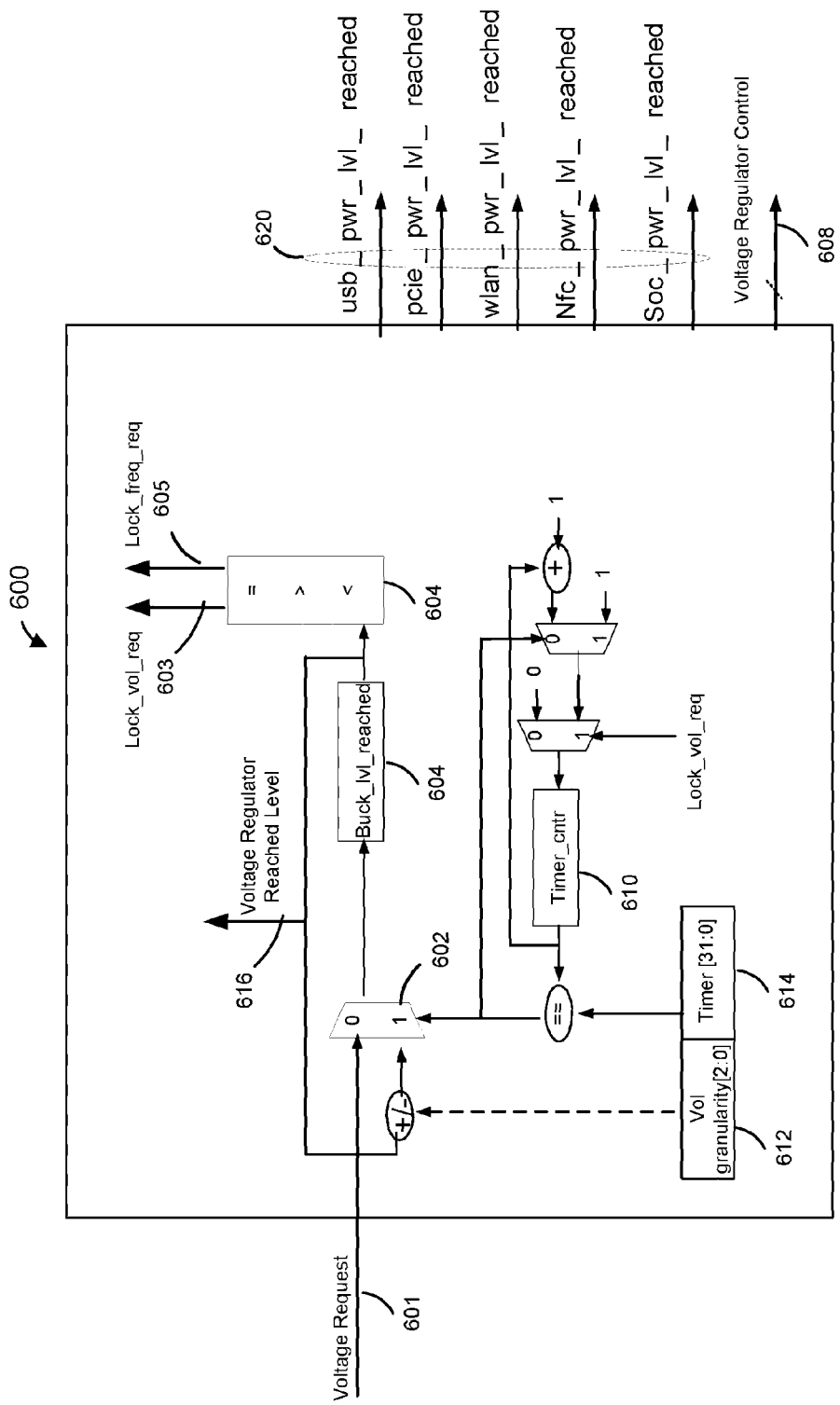
FIG. 9 is a block diagram of an example implementation of a voltage control unit, according to an embodiment.

FIG. 9 is a block diagram of an example implementation of a voltage control unit 600 suitable for use as the voltage control unit 210 of FIG. 5, according to an embodiment. For ease of explanation, the voltage control unit 600 will be described below with reference FIGS. 1 and 5. However, the voltage control unit 600 is used by systems other than the system 200 of FIG. 5 and/or by wireless devices other than the wireless device 100 of FIG. 1, in other embodiments. Similarly, the system 200 and/or the wireless device 100 utilize voltage control units other than the unit 600, in other embodiments.

In an embodiment, the voltage control unit 600 receives a voltage request 601 from the voltage selector unit 206 (FIG. 5) and determines whether the requested voltage is greater than, less than, or equal to voltage currently being generated by the voltage regulator 126 (FIG. 1). In response to determining that the voltage request is greater than or less than the current voltage output of the regulator 126, the voltage control unit 600 asserts a voltage request lock signal 603, in an embodiment. Additionally, in response to determining that the voltage request is greater than the current voltage output of the voltage regulator 126, the voltage control unit 600 asserts a frequency request lock signal 605, in an embodiment.

In response to determining that the requested voltage is equal to the current output of the voltage regulator 126, the voltage control unit 600 de-asserts the voltage request signal lock 603 and allows the voltage selector unit 206 to provide a new voltage request to the voltage control unit 600. When a new voltage request, which may be greater than or less than the current output of the voltage regulator 126, is received by the voltage control unit 600, the voltage control unit 600 again asserts the voltage request lock signal 603 and, if needed, the frequency request lock signal 605, and generates a control signal 608 to control the voltage regulator 126 to transition to the new value requested by the voltage request 601. To allow the voltage control unit 600 to determine when the transition to the new requested voltage has been completed by the voltage regulator 126, the voltage control unit also initiates a timer counter 610, and runs the timer counter 610 for the amount of time needed by the voltage regulator 126 to change by a smallest change supported by the voltage regulator 126. The smallest change supported by the voltage regulator 126 and the amount of timed needed to by the voltage regulator 126 to complete a transition corresponding to the smallest supported change, are stored in the voltage control unit 600 in a voltage granularity register 612 and a transition time register 614, respectively. The voltage control unit 600 compares the output of the timer counter 610 to the value stored in the transition time register 612 and, when the output of the timer counter 610 is equal to the value stored in the transition time register 612, determines that the voltage regulator 126 has completed a transition by the voltage smallest change supported by the voltage regulator 126. Then, the voltage control unit 600 determines whether a further change in the output voltage of the regulator 126 is needed to reach the voltage level indicated by the voltage request received from the voltage selector 206. If further transition is needed, the voltage control unit 600 again initiates the timer 610. When the requested voltage has been reached, and no further transition of the voltage regulator 126 is needed, the voltage control unit 600 de-asserts the voltage request lock 603 and, when needed, the frequency request lock signal 605, and sets the regulator voltage register 604 to the value of the voltage request 601.

In some embodiments, the voltage control unit 600 is also configured to output a set of signals 620 indicating to respective components 118, 119 that the voltage level requested by the respective components 118, 119 has been reached by the voltage regulator 126. The signals 620 indicate to a components 118, 119 that the component 118, 119 can now perform the activity requested by the component 118, 119, in an embodiment. The voltage control unit 600 additionally outputs a voltage regulator reached level signal 616 that indicates the voltage level currently reached by the voltage regulator 126, in an embodiment.

Figure 10:
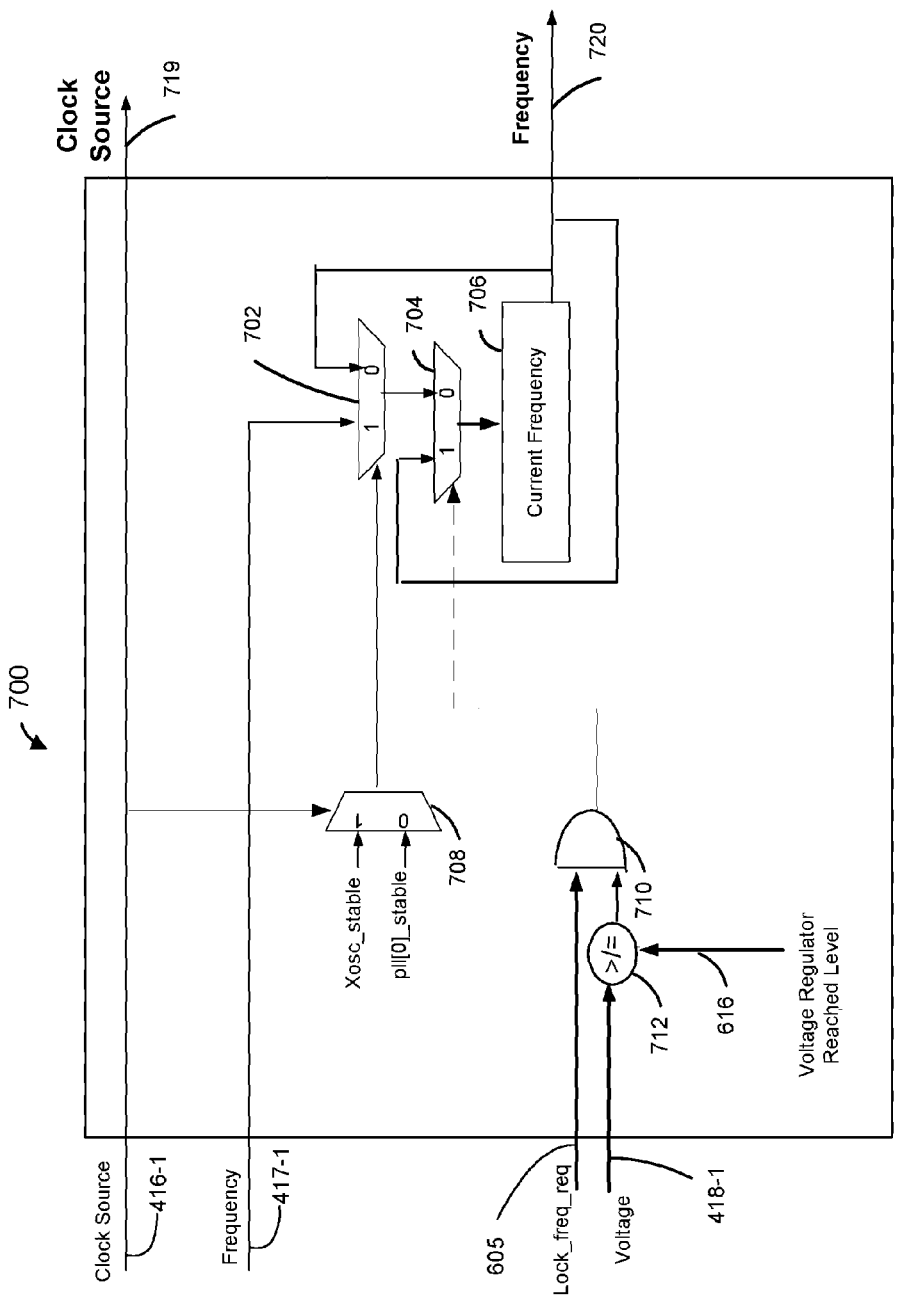
FIG. 10 is a block diagram of an example implementation of a frequency control unit, according to an embodiment.

FIG. 10 is a block diagram of an example implementation of a frequency control unit 700 suitable for use by the frequency control unit 208 of FIG. 5, according to an embodiment. In an embodiment, the frequency control unit 208 of FIG. 5 includes a respective frequency control unit such as the frequency control unit 700 corresponding to each one of the software components 119 and used to control the clock frequency for the corresponding one of the software components 119. For ease of explanation, the frequency controller 700 will be described below with reference FIGS. 1 and 5. However, the frequency controller 700 is used by systems other than the system 200 of FIG. 5 and/or by wireless devices other than the wireless device 100 of FIG. 1, in other embodiments. Similarly, the system 200 and/or the wireless device 100 utilize frequency controllers other than the frequency controller 700, in other embodiments.

The clock frequency control unit 700 includes several multiplexers, including a multiplexer 702, a multiplexer 704, and a multiplexer 708, in the illustrated embodiment. In operation, the frequency controller 700 receives the clock source signal 416-1 (FIG. 7A), and the clock frequency request signal 417-1 (FIG. 7A). The clock frequency request signal is provided as a first input to the MUX 702 and a signal indicative of the current clock frequency, stored in a register 706, is provided as a second input to the MUX 702. The multiplexer 708 receives as respective inputs signals indicating whether a particular clock source (e.g., a PLL or an internal CPU clock source) is stable and can be used for generating the requested clock frequency indicated by the clock frequency request signal 417-1. The clock source signal 416-1 controls the multiplexer 708 to select an appropriate stability indicator that corresponds to the clock source indicated by the clock source signal 416-1. The stability indicator selected by the MUX 708 controls the MUX 702 to output the frequency request signal 417-1 when the appropriate clock source is indicated to be stable by the output signal of the MUX 708, and to output the current frequency signal when the appropriate clock source is indicated to be unstable by the output of the MUX 708, in an embodiment.

The output of the MUX 702 is provided as a first input to the MUX 704, and a signal indicative of the current clock frequency, stored in the register 706, is provided as a second input to the MUX 704. The MUX 704 generally ensures that a new frequency request signal is provided to the frequency controller 128 only when a sufficient voltage needed by the CPU 114-1 to operate at the clock frequency indicated by the new frequency request is being provided to the CPU 114-1. In an embodiment, the frequency control unit 700 receives, from the voltage control unit 600 (FIG. 9), the frequency request lock signal 605. The frequency control unit 700 also receives from the frequency and voltage request unit 400 the voltage level request signal 418-1 corresponding to the clock frequency request indicated by the signal 417-1. Additionally, the frequency control unit 700 receives from the voltage control unit 600 the voltage regulator reached voltage signal 616 indicative of the currently reached voltage of the voltage regulator 126. A comparator 712 compares the currently reached voltage indicated by the signal 616 to the voltage level indicated by the signal 418-1 to determine whether the requested voltage level, as indicated by the signal 418-1, is (i) less than or (ii) greater than or equal to the currently reached voltage, as indicated by the signal 616, in an embodiment. The output of the comparator 712 and the frequency request lock signal 605 are provided to an AND gate 710. The output of the AND gate 710 controls the MUX 704. In the event that the voltage level indicated by the signal 418-1 is greater than or equal to the voltage level indicated by the signal 616, and the frequency request is not blocked by the frequency request lock signal 605, the MUX 704 sets the register 706 to the new clock frequency indicated by the signal 417-1. On the other hand, in the event that the voltage level indicated by the signal 418-1 is less than the voltage level indicated by the signal 616 and/or the frequency request is blocked by the frequency request lock signal 605, the MUX 704 maintains the value of the register 706 at the value of the current clock frequency stored in the register 706. The value stored in the register 706 is provided as a clock frequency output signal 720 of the frequency control unit 700. The clock frequency signal 720 and a clock source signal 719, which corresponds to the clock source signal 416-1, in an embodiment, are provided to the frequency controller 128. The frequency controller 128 generates, based on the clock source signal 719 and the frequency signal 720, a clock frequency signal for the CPU 114-1, in an embodiment.

Figure 11:
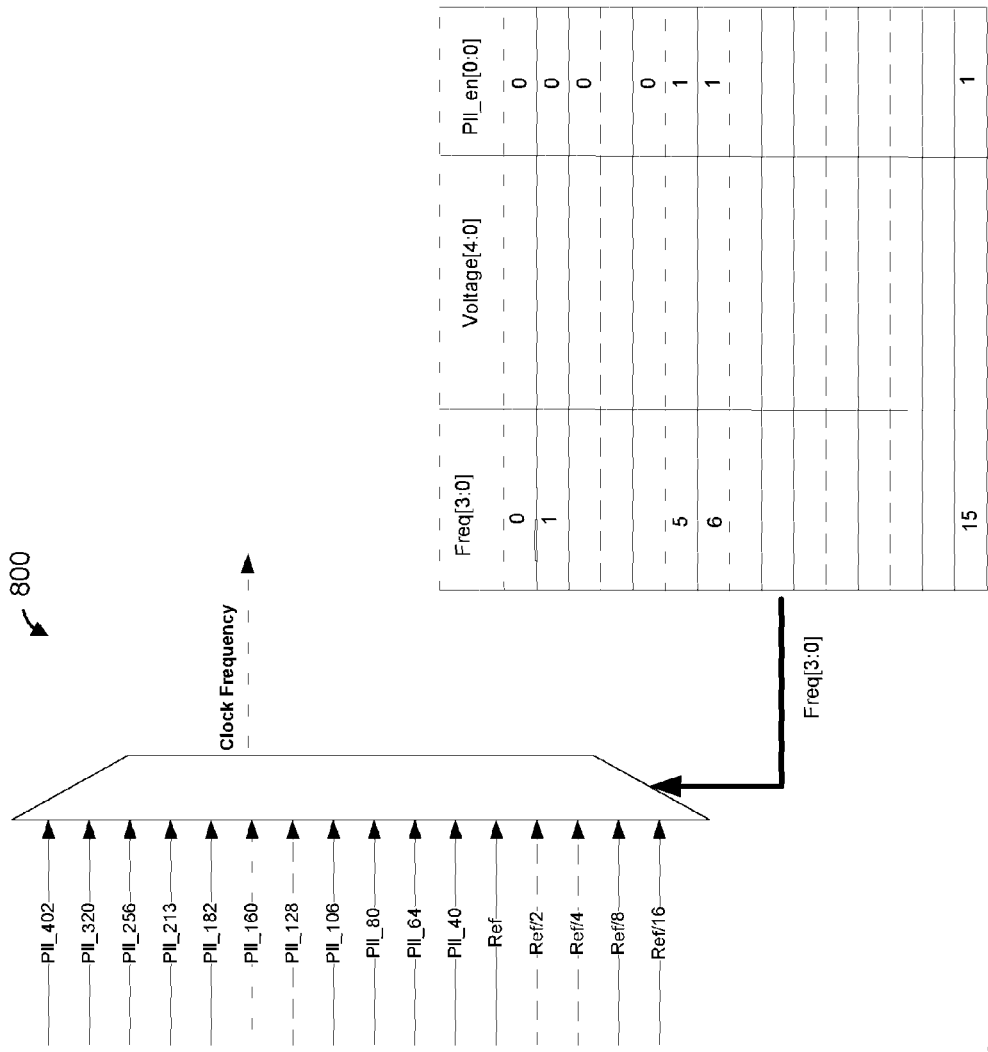
FIG. 11 is an example implementation of a frequency controller, according to an embodiment.

Turning briefly to FIG. 11, an example implementation of a frequency controller 800 suitable for use as the frequency controller 128 of FIG. 1 is shown. The frequency controller 800 is controlled by a signal corresponding to a frequency request, such as a signal corresponding to a frequency value indicated in the frequency and voltage table 300 of FIG. 6, in an embodiment. In response to receiving the signal indicative of the requested clock frequency, the frequency controller 800 outputs a clock signal corresponding to the requested clock frequency. Because the clock frequency request also indicate a source to be used for the requested clock, simple single tiered selection logic is used to select the clock signal by the frequency controller 800 to provide the clock requested clock frequency, in at least some embodiments.

Figure 12:
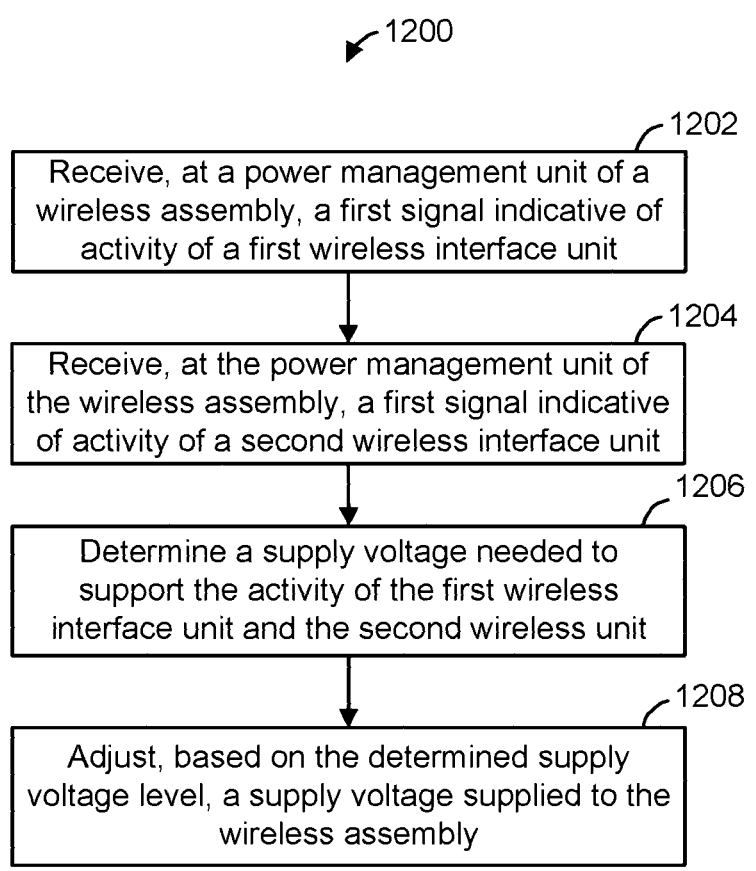
FIG. 12 is a flow diagram of an example method 1200 for dynamically adjusting power consumption of a wireless assembly in a communication device, according to an embodiment.

FIG. 12 is a flow diagram of an example method 1200 for dynamically adjusting power consumption of a wireless assembly in a communication device, according to an embodiment. With reference to FIGS. 1 and 5, respectively, the method 400 is performed in a wireless device 100 in general, and by the system 200 in particular, in some embodiments. In other embodiments, the method 400 is performed by other suitable components of the wireless device 100 or by other suitable communication devices. Similarly, the wireless device 100 and/or the system 200 perform other suitable methods for dynamically adjusting power consumption, in other embodiments.

At block 1202, a power management unit, such as the DVFS unit 120 of FIG. 1, receives a first signal indicative of activity of a first wireless interface unit. For example, the power management unit receives the first signal from the WLAN interface unit 110-1, in an embodiment. The first signal is indicative of activity of the WLAN interface unit 110-1, in this embodiment. For example, the first signal indicates whether the WLAN interface unit 110-1 is operating in power safe mode or in active mode and also indicates which function or functions are currently being performed (or are about to be performed), such as receiving a packet, transmitting a packet, performing a scan, etc. by the WLAN interface unit 110-1, in an embodiment. In another embodiment, the power management unit receives the first signal from a wireless communication interface unit other than the WLAN interface unit 110-1. The first signal indicates activity of the wireless communication interface unit other than the WLAN interface unit 110-1, in this embodiment.

At block 1204, the power management unit, such as the DVFS unit 120 of FIG. 1, receives a second signal indicative of activity of a first wireless interface unit. For example, the power management unit receives the second signal from the BT interface unit 110-2, in an embodiment. The second signal is indicative of activity of the BT interface unit 110-2, in this embodiment. For example, the second signal indicates whether the BT interface unit 110-2 is operating in power safe mode or in active mode and also indicates which function or functions are currently being performed (or are about to be performed), such as receiving a packet, transmitting a packet, performing a scan, etc. by the BT interface unit 110-2, in an embodiment. In another embodiment, the power management unit receives the second signal from a wireless communication interface unit other than the BT interface unit 110-2. The second signal indicates activity of the wireless communication interface unit other than the BT interface unit 110-2, in this embodiment.

At block 1206, the power management unit determines a supply voltage level needed to support the activity of the first wireless interface unit, indicated by the first signal received at block 1202, and the activity of the second wireless interface unit, indicated by the second signal received at block 1204. For example, the power management unit determines respective voltages needed by the first wireless interface unit and the second wireless unit to perform the respective activities indicated by the first signal and the second signal, and selects the greater one of the voltages needed by the first wireless interface unit and the second wireless interface unit, in an example embodiment. Other methods for determining the supply voltage level needed to support the activity of the first wireless interface unit at block 1206 in other embodiments.

At block 1208, the power management unit adjusts, based on the supply voltage level determined at block 1206, a supply voltage supplied to the wireless assembly. For example, the power management unit controls a voltage regulator that generates the supply voltage of the wireless assembly to set the output voltage of the voltage regulator to the supply voltage level determined at block 1206, in an embodiment.

As described, the various techniques described above may be implemented in hardware, firmware, software, or a combination of hardware, firmware, and/or software. When implemented in software, the software may be stored in any computer readable memory such as on a magnetic disk, an optical disk, or other storage medium, in a RAM or ROM or flash memory of a computer, processor, integrated circuit, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method, comprising: receiving, at a power management device of a wireless communication assembly, respective signals indicative of respective voltage supply levels required by respective hardware devices among a plurality of hardware devices of the wireless communication assembly, wherein the respective required voltage supply levels vary over time; selecting, at the power management device, a voltage supply level corresponding to a maximum voltage supply level indicated by the respective received signals; and adjusting, based on the selected supply voltage level, a supply voltage supplied to the wireless communication assembly so that the selected voltage supply level is supplied to all of the respective hardware devices of the wireless communication assembly; and wherein the plurality of hardware devices includes a first wireless network interface configured to operate according to a first communication protocol, and a second wireless network interface configured to operate according to a second communication protocol, the second communication protocol being different than the first communication protocol; and receiving respective signals indicative of respective voltage supply levels required by respective hardware devices includes receiving a first signal indicating a first voltage supply level needed to support activity of the first wireless network interface, and a second signal indicating a second voltage supply level needed to support activity of the second wireless network interface; selecting the voltage supply level corresponding to a maximum voltage supply level indicated by the respective received signals includes selecting a voltage supply level that is at least a maximum of the first voltage supply level needed to support activity of the first wireless network interface, and the second voltage supply level needed to support activity of the second wireless network interface.

2. The method of claim 1, wherein: receiving the first signal indicating the first voltage supply level needed to support activity of the first wireless network interface and the second signal indicating the second voltage supply level needed to support activity of the first wireless network interface comprises receiving: a first signal indicative of activity of the first wireless network interface, and a second signal indicative of activity of the second wireless network interface; and the method further comprises: determining the first voltage supply level needed to support activity of the first wireless network interface based on the first signal indicative of activity of the first wireless network interface, and determining the second voltage supply level needed to support activity of the second wireless network interface based on the second signal indicative of activity of the second wireless network interface.

3. The method of claim 2, wherein:
determining the first voltage supply level comprises accessing a first table that indicates correspondences between i) different levels of activity of the first wireless network interface, and ii) different voltage supply levels; and
determining the second voltage supply level comprises accessing a second table that indicates correspondences between i) different levels of activity of the second wireless network interface, and ii) different voltage supply levels.

4. The method of claim 1, wherein: the plurality of hardware devices further includes a processor configured to execute machine readable instructions; and receiving respective signals indicative of respective voltage supply levels required by respective hardware devices further includes receiving a third signal indicating a third voltage supply level needed to support activity of the processor; selecting the voltage supply level corresponding to a maximum voltage supply level indicated by the respective received signals includes selecting a voltage supply level that is at least a maximum of the first voltage supply level needed to support activity of the first wireless network interface, the second voltage supply level needed to support activity of the second wireless network interface, and the third voltage supply level needed to support activity of the processor.

5. The method of claim 4, wherein:
the processor is a first processor;
the plurality of hardware devices further includes a second processor configured to execute machine readable instructions; and
receiving respective signals indicative of respective voltage supply levels required by respective hardware devices further includes receiving a fourth signal indicating a fourth voltage supply level needed to support activity of the second processor;
selecting the voltage supply level corresponding to a maximum voltage supply level indicated by the respective received signals includes selecting a voltage supply level that is at least a maximum of
the first voltage supply level needed to support activity of the first wireless network interface,
the second voltage supply level needed to support activity of the second wireless network interface,
the third voltage supply level needed to support activity of the first processor, and
the fourth voltage supply level needed to support activity of the second processor.

6. The method of claim 5, wherein:
the third signal further indicates a first clock frequency needed to support activity of the second processor;
the fourth signal further indicates a second clock frequency needed to support activity of the second processor;
the method further comprises:
adjusting, based on the indicated first clock frequency, a frequency of a first clock supplied to the first processor, and
adjusting, based on the indicated second clock frequency, a frequency of a second clock supplied to the second processor.

7. The method of claim 1, wherein: the plurality of hardware devices further includes a wired interface device configured to interface the wireless communication assembly with a host assembly; and selecting the voltage supply level corresponding to a maximum voltage supply level indicated by the respective received signals includes selecting a voltage supply level that is at least a maximum of the first voltage supply level needed to support activity of the first wireless network interface, the second voltage supply level needed to support activity of the second wireless network interface, and a third voltage supply level needed to support activity of the wired interface device.

8. The method of claim 7, wherein:
the wired interface device is a first wired interface device;
the plurality of hardware devices further includes a second wired interface device configured to interface the wireless communication assembly with the host assembly; and
selecting the voltage supply level corresponding to a maximum voltage supply level indicated by the respective received signals includes selecting a voltage supply level that is at least a maximum of
the first voltage supply level needed to support activity of the first wireless network interface,
the second voltage supply level needed to support activity of the second wireless network interface,
the third voltage supply level needed to support activity of the first wired interface device, and
a fourth voltage supply level needed to support activity of the second wired interface device.

9. The method of claim 1, where adjusting the voltage supply level includes providing a control signal to a voltage generator that supplies supply voltage to the wireless communication assembly.

10. An apparatus, comprising: a wireless communication assembly, comprising: a plurality of hardware devices, and a power management device; wherein the power management device is configured to: receive respective signals indicative of respective voltage supply levels required by respective hardware devices among the plurality of hardware devices of the wireless communication assembly, wherein the respective required voltage supply levels vary over time; select a voltage supply level corresponding to a maximum voltage supply level indicated by the respective received signals; and adjust a supply voltage supplied to the wireless communication assembly so that the selected voltage supply level is supplied to all of the respective hardware devices of the wireless communication assembly; and wherein the plurality of hardware devices includes: a first wireless network interface configured to operate according to a first communication protocol, and a second wireless network interface configured to operate according to a second communication protocol, the second communication protocol being different than the first communication protocol; the power management device is configured to receive: a first signal indicating a first voltage supply level needed to support activity of the first wireless network interface, and a second signal indication a second voltage supply level needed to support activity of the second wireless network interface; and the power management device is configured to select a voltage supply level that is at least a maximum of the first voltage supply level needed to support activity of the first wireless network interface, and the second voltage supply level needed to support activity of the second wireless network interface.

11. The method of claim 10, wherein: the power management device is configured to receive: a first signal indicative of activity of the first wireless network interface, and a second signal indicative of activity of the second wireless network interface; and the power management device is configured to: determine the first voltage supply level needed to support activity of the first wireless network interface based on the first signal indicative of activity of the first wireless network interface, and determine the second voltage supply level needed to support activity of the second wireless network interface based on the second signal indicative of activity of the second wireless network interface.

12. The apparatus of claim 11, wherein the power management device is configured to:
access a first table that indicates correspondences between i) different levels of activity of the first wireless network interface, and ii) different voltage supply levels; and
access a second table that indicates correspondences between i) different levels of activity of the second wireless network interface, and ii) different voltage supply levels.

13. The method of claim 10, wherein: the plurality of hardware devices further includes a processor configured to execute machine readable instructions; and the power management device is configured to: receive a third signal indicating a third voltage supply level needed to support activity of the processor; and select a voltage supply level that is at least a maximum of: the first voltage supply level needed to support activity of the first wireless network interface, the second voltage supply level needed to support activity of the second wireless network interface, and the third voltage supply level needed to support activity of the processor.

14. The apparatus of claim 13, wherein:
the processor is a first processor;
the plurality of hardware devices further includes a second processor configured to execute machine readable instructions; and
the power management device is configured to:
receive a fourth signal indicating a fourth voltage supply level needed to support activity of the second processor; and
select a voltage supply level that is at least a maximum of:
the first voltage supply level needed to support activity of the first wireless network interface,
the second voltage supply level needed to support activity of the second wireless network interface,
the third voltage supply level needed to support activity of the first processor, and
the fourth voltage supply level needed to support activity of the second processor.

15. The apparatus of claim 14, wherein:
the third signal further indicates a first clock frequency needed to support activity of the second processor;
the fourth signal further indicates a second clock frequency needed to support activity of the second processor;
the power management device is configured to:
adjust, based on the indicated first clock frequency, a frequency of a first clock supplied to the first processor, and
adjust, based on the indicated second clock frequency, a frequency of a second clock supplied to the second processor.

16. The method of claim 10, wherein; the plurality of hardware devices further includes a wired interface device configured to interface the wireless communication assembly with a host assembly; and the power management device is configured to: select a voltage supply level that is at least a maximum of: the first voltage supply level needed to support activity of the first wireless network interface, the second voltage supply level needed to support activity of the second wireless network interface, and a third voltage supply level needed to support activity of the wired interface device.

17. The apparatus of claim 16, wherein:
the wired interface device is a first wired interface device;
the plurality of hardware devices further includes a second wired interface device configured to interface the wireless communication assembly with the host assembly; and
the power management device is configured to select a voltage supply level that is at least a maximum of
the first voltage supply level needed to support activity of the first wireless network interface,
the second voltage supply level needed to support activity of the second wireless network interface,
the third voltage supply level needed to support activity of the first wired interface device, and
a fourth voltage supply level needed to support activity of the second wired interface device.

18. The apparatus of claim 10, where the power management device is configured to adjust the voltage supply level at least by providing a control signal to a voltage generator that supplies supply voltage to the wireless communication assembly.

* * * * *